(12) United States Patent
Goodwin et al.

(10) Patent No.: US 8,875,198 B1
(45) Date of Patent: Oct. 28, 2014

(54) NETWORK VIDEO UNIT

(75) Inventors: Mark D. Goodwin, Mountain View, CA (US); Ted Shaffer, Los Altos Hills, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 1948 days.

(21) Appl. No.: 10/215,904

(22) Filed: Aug. 9, 2002

Related U.S. Application Data

(60) Provisional application No. 60/313,719, filed on Aug. 19, 2001.

(51) Int. Cl.
*H04N 7/173* (2011.01)
*H04N 21/25* (2011.01)

(52) U.S. Cl.
CPC ..................................... *H04N 21/25* (2013.01)
USPC ............................................................ 725/87

(58) Field of Classification Search
USPC ....................................................... 725/39, 98
See application file for complete search history.

(56) References Cited

U.S. PATENT DOCUMENTS

| | | | |
|---|---|---|---|
| 4,485,219 A | 11/1984 | Falk et al. | |
| 5,193,208 A | 3/1993 | Yokota et al. | |
| 5,333,091 A | 7/1994 | Iggulden et al. | |
| 5,455,630 A | 10/1995 | McFarland et al. | |
| 5,485,219 A | 1/1996 | Woo | |
| 5,532,735 A | 7/1996 | Blahut et al. | |
| 5,600,366 A | 2/1997 | Schulman | |
| 5,652,615 A | 7/1997 | Bryant et al. | |
| 5,661,516 A | 8/1997 | Carles | |
| 5,664,948 A | 9/1997 | Dimitriadis et al. | |
| 5,692,093 A | 11/1997 | Iggulden et al. | |
| 5,696,866 A | 12/1997 | Iggulden et al. | |
| 5,724,472 A | 3/1998 | Abecassis | |
| 5,790,423 A * | 8/1998 | Lau et al. ........................ | 700/94 |

(Continued)

FOREIGN PATENT DOCUMENTS

| | | |
|---|---|---|
| AU | 694568 | 3/1996 |
| DE | 199 39 410 A1 | 3/2001 |

(Continued)

OTHER PUBLICATIONS

Office action mailed May 23, 2007, for U.S. Appl. No. 10/124,190.

(Continued)

*Primary Examiner* — Nathan Flynn
*Assistant Examiner* — Omar S Parra
(74) *Attorney, Agent, or Firm* — McDonnell Boehnen Hulbert & Berghoff LLP

(57) ABSTRACT

Providing content to content receiving devices, such as digital video recorders, connected to a computer network through a content provider is described. According to one aspect, a server maintains a database correlating contact information to content receiving devices in its network. A user navigates to a web site of the content provider and selects a piece of content, which prompts the content provider to query the server for the contact information, and then transmit a request to download the piece of content to the content receiving device. The request can be a set of content identification information that automatically populates a content guide at the receiving device with an entry corresponding to the requested piece of content. This entry allows the user to confirm, interrupt, resume and cancel a download of the content as desired.

47 Claims, 12 Drawing Sheets

(56) References Cited

U.S. PATENT DOCUMENTS

| | | | |
|---|---|---|---|
| 5,793,366 A | 8/1998 | Mano et al. | |
| 5,848,397 A | 12/1998 | Marsh et al. | |
| 5,883,621 A | 3/1999 | Iwamura | |
| 5,886,731 A | 3/1999 | Ebisawa | |
| 5,892,536 A | 4/1999 | Logan et al. | |
| 5,986,692 A | 11/1999 | Logan et al. | |
| 5,987,210 A | 11/1999 | Iggulden et al. | |
| 5,995,092 A | 11/1999 | Yuen et al. | |
| 5,999,688 A | 12/1999 | Iggulden et al. | |
| 6,005,861 A | 12/1999 | Humpleman | |
| 6,055,560 A | 4/2000 | Mills et al. | |
| 6,147,714 A | 11/2000 | Terasawa et al. | |
| 6,166,730 A | 12/2000 | Goode et al. | |
| 6,177,931 B1 | 1/2001 | Alexander et al. | |
| 6,215,526 B1 | 4/2001 | Barton et al. | |
| 6,226,444 B1 | 5/2001 | Goldschmidt Iki et al. | |
| 6,233,389 B1 | 5/2001 | Barton et al. | |
| 6,262,722 B1 | 7/2001 | Allison et al. | |
| 6,269,394 B1 | 7/2001 | Kenner et al. | |
| 6,288,716 B1 | 9/2001 | Humpleman et al. | |
| 6,310,886 B1 | 10/2001 | Barton | |
| 6,324,338 B1 | 11/2001 | Wood et al. | |
| 6,327,418 B1 | 12/2001 | Barton | |
| 6,351,270 B1 | 2/2002 | Nishikawa et al. | |
| 6,360,053 B1 | 3/2002 | Wood et al. | |
| 6,396,546 B1 | 5/2002 | Alten et al. | |
| 6,456,308 B1 | 9/2002 | Agranat et al. | |
| 6,477,705 B1 | 11/2002 | Yuen et al. | |
| 6,480,889 B1 | 11/2002 | Saito et al. | |
| 6,481,010 B2 | 11/2002 | Nishikawa et al. | |
| 6,483,548 B1 | 11/2002 | Allport | |
| 6,507,951 B1 | 1/2003 | Wugofski | |
| 6,564,380 B1* | 5/2003 | Murphy | 725/86 |
| 6,642,939 B1 | 11/2003 | Vallone et al. | |
| 6,661,468 B2 | 12/2003 | Alten et al. | |
| 6,671,454 B1 | 12/2003 | Kaneko et al. | |
| 6,732,372 B2 | 5/2004 | Tomita et al. | |
| 6,757,906 B1 | 6/2004 | Look et al. | |
| 6,760,916 B2* | 7/2004 | Holtz et al. | 725/34 |
| 6,760,918 B2 | 7/2004 | Rodriguez et al. | |
| 6,772,433 B1 | 8/2004 | LaJoie et al. | |
| 6,832,385 B2 | 12/2004 | Young et al. | |
| 6,839,769 B2 | 1/2005 | Needham et al. | |
| 6,870,570 B1 | 3/2005 | Bowser | |
| 6,922,845 B2 | 7/2005 | Yap et al. | |
| 7,143,353 B2 | 11/2006 | McGee et al. | |
| 7,171,677 B1 | 1/2007 | Ochiai | |
| 7,277,870 B2* | 10/2007 | Mourad et al. | 705/51 |
| 7,363,278 B2* | 4/2008 | Schmelzer et al. | 705/67 |
| 7,477,833 B2 | 1/2009 | Kato et al. | |
| 7,627,889 B2 | 12/2009 | Jaff et al. | |
| 7,665,111 B1* | 2/2010 | Barton et al. | 725/58 |
| 7,917,008 B1 | 3/2011 | Lee et al. | |
| 2001/0014891 A1 | 8/2001 | Hoffert et al. | |
| 2001/0028782 A1 | 10/2001 | Ohno et al. | |
| 2001/0054026 A1 | 12/2001 | Choate | |
| 2002/0065678 A1 | 5/2002 | Peliotis et al. | |
| 2002/0087661 A1 | 7/2002 | Matichuk et al. | |
| 2002/0092021 A1 | 7/2002 | Yap et al. | |
| 2002/0092022 A1 | 7/2002 | Dudkicwicz et al. | |
| 2002/0129358 A1* | 9/2002 | Buehl et al. | 725/1 |
| 2002/0133821 A1 | 9/2002 | Shteyn | |
| 2002/0154892 A1 | 10/2002 | Hoshen et al. | |
| 2002/0162109 A1 | 10/2002 | Shteyn | |
| 2002/0174430 A1 | 11/2002 | Ellis et al. | |
| 2002/0174444 A1 | 11/2002 | Gatto et al. | |
| 2002/0178232 A1* | 11/2002 | Ferguson | 709/217 |
| 2003/0093792 A1 | 5/2003 | Labeeb et al. | |
| 2003/0095791 A1* | 5/2003 | Barton et al. | 386/83 |
| 2003/0101459 A1 | 5/2003 | Edson | |
| 2003/0106062 A1 | 6/2003 | Shteyn et al. | |
| 2003/0126598 A1 | 7/2003 | Agnihotri et al. | |
| 2003/0167473 A1 | 9/2003 | Klosterman et al. | |
| 2004/0045020 A1 | 3/2004 | Witt et al. | |
| 2004/0083273 A1* | 4/2004 | Madison et al. | 709/217 |
| 2004/0128317 A1 | 7/2004 | Sull et al. | |
| 2004/0158856 A1* | 8/2004 | Grooters et al. | 725/39 |
| 2005/0028206 A1* | 2/2005 | Cameron et al. | 725/46 |
| 2005/0117461 A1 | 6/2005 | Seo et al. | |
| 2005/0154681 A1 | 7/2005 | Schmeizer | |
| 2005/0216942 A1 | 9/2005 | Barton | |
| 2005/0240295 A1 | 10/2005 | Vilcauskas et al. | |
| 2005/0251827 A1 | 11/2005 | Ellis et al. | |
| 2005/0273819 A1 | 12/2005 | Knudson et al. | |
| 2005/0273827 A1* | 12/2005 | Javed et al. | 725/90 |
| 2005/0283810 A1 | 12/2005 | Ellis et al. | |
| 2006/0085821 A9* | 4/2006 | Simmons et al. | 725/61 |
| 2006/0164930 A1 | 7/2006 | Seo et al. | |
| 2006/0200449 A1 | 9/2006 | Pauws | |
| 2007/0136445 A1 | 6/2007 | Sweatt et al. | |
| 2007/0147782 A1 | 6/2007 | Shibata | |
| 2007/0244880 A1 | 10/2007 | Martin et al. | |
| 2007/0282819 A1* | 12/2007 | Lynn et al. | 707/3 |
| 2008/0086751 A1* | 4/2008 | Horn et al. | 725/87 |
| 2009/0030978 A1* | 1/2009 | Johnson et al. | 709/203 |
| 2009/0193451 A1* | 7/2009 | O'Neil | 725/29 |
| 2009/0204994 A1* | 8/2009 | Kaminski et al. | 725/47 |
| 2009/0222392 A1 | 9/2009 | Martin et al. | |
| 2011/0013885 A1* | 1/2011 | Wong et al. | 386/297 |

FOREIGN PATENT DOCUMENTS

| | | |
|---|---|---|
| EP | 0693 215 B1 | 11/1998 |
| EP | 1 071 287 A2 | 1/2001 |
| JP | 07-021619 | 1/1995 |
| WO | WO 95/52279 A1 | 11/1998 |
| WO | WO 99/04561 | 1/1999 |
| WO | WO 99/52285 | 10/1999 |
| WO | WO 00/07368 A1 | 2/2000 |
| WO | WO 00/18108 A2 | 3/2000 |
| WO | WO 00/18108 A3 | 3/2000 |
| WO | WO 00/28736 A1 | 5/2000 |
| WO | WO 00/44171 | 7/2000 |
| WO | WO 00/56072 | 9/2000 |
| WO | WO 00/58833 A1 | 10/2000 |
| WO | WO 00/58834 A1 | 10/2000 |
| WO | WO 00/58967 A1 | 10/2000 |
| WO | WO 00/59214 A1 | 10/2000 |
| WO | WO 00/62298 A1 | 10/2000 |
| WO | WO 00/62299 A1 | 10/2000 |
| WO | WO 00/67475 A1 | 11/2000 |
| WO | WO 01/06370 A1 | 1/2001 |
| WO | WO 01/22729 A1 | 3/2001 |
| WO | WO 01/46843 A2 | 6/2001 |
| WO | WO 01/47238 A2 | 6/2001 |
| WO | WO 01/47249 A2 | 6/2001 |
| WO | WO 01/47279 A2 | 6/2001 |
| WO | WO 01/65762 A2 | 9/2001 |
| WO | WO 01/65862 A2 | 9/2001 |
| WO | WO-01/76249 A1 | 10/2001 |
| WO | WO 01/89203 A2 | 11/2001 |
| WO | WO 00/62533 A1 | 10/2002 |
| WO | 2004084448 | 9/2004 |

OTHER PUBLICATIONS

Office action mailed Sep. 24, 2007, for U.S. Appl. No. 10/124,190.
Office action mailed Aug. 10, 2005, for U.S. Appl. No. 10/124,583.
Office action mailed Dec. 5, 2007, for U.S. Appl. No. 10/124,064.
Office action mailed Aug. 17, 2007, for U.S. Appl. No. 10/124,583.
Office action mailed May 16, 2006, for U.S. Appl. No. 10/124,583.
Office action mailed Oct. 6, 2004 for U.S. Appl. No. 10/124,506.
U.S. Appl. No. 10/124,506 entitled "Guide Content Management," filed Apr. 16, 2002.
U.S. Appl. No. 10/124,190 entitled "Accessing Programs Using Networked Digital Video Recording Devices," filed Apr. 16, 2002.
U.S. Appl. No. 10/124,583 entitled "Method and Apparatus for Sending Content Between Devices," filed Apr. 16, 2002.
U.S. Appl. No. 10/124,064 entitled "Resolving Recording Conflicts," filed Apr. 16, 2002.
Sonicblue Incorporated, ReplayTV 5000 User's Guide, 2002.
Gotuit Video Slide Show, http://www.gotuit.com/slides/slide1.htm, printed Jun. 13, 2002.

(56) References Cited

OTHER PUBLICATIONS

World Intellectual Property Organization, International Search Report, PCT/US2004/008632, May 15, 2007.
World Intellectual Property Organization, International Search Report and Written Opinion, PCT/US04/08891, Jul. 25, 2008.
USPTO, Notice of Allowance, U.S. Appl. No. 10/124,064, Feb. 22, 2011.
USPTO, Non-final office action, U.S. Appl. No. 10/124,064, Jun. 4, 2010.
USPTO, Non-final office action, U.S. Appl. No. 10/124,064, May 27, 2009.
USPTO, Non-final office action, U.S. Appl. No. 10/124,064, Dec. 12, 2008.
USPTO, Final office action, U.S. Appl. No. 10/124,064, Dec. 24, 2009.
USPTO, Final office action, U.S. Appl. No. 10/124,064, May 29, 2008.
USPTO, Non-final office action, U.S. Appl. No. 10/124,190, Jun. 7, 2010.
USPTO, Non-final office action, U.S. Appl. No. 10/124,190, Mar. 24, 2008.
USPTO, Final office action, U.S. Appl. No. 10/124,190, Feb. 22, 2011.
USPTO, Final office action, U.S. Appl. No. 10/124,190, Sep. 3, 2008.
TIVO Viewer's Guide, TiVo Inc., Alviso, CA, 2002.
Barton, James, U.S. Appl. No. 60/186,551, Downloading Movies to Lots of People, Mar. 2, 2000.
USPTO, Final office action, U.S. Appl. No. 10/124,583, Apr. 20, 2011.
USPTO, Final office action, U.S. Appl. No. 10/124,583, Feb. 20, 2008.
USPTO, Final office action, U.S. Appl. No. 10/124,583, Mar. 31, 2010.
USPTO, Non-final office action, U.S. Appl. No. 10/124,583, Oct. 26, 2010.
USPTO, Non-final office action, U.S. Appl. No. 10/124,583, Jul. 30, 2009.

* cited by examiner

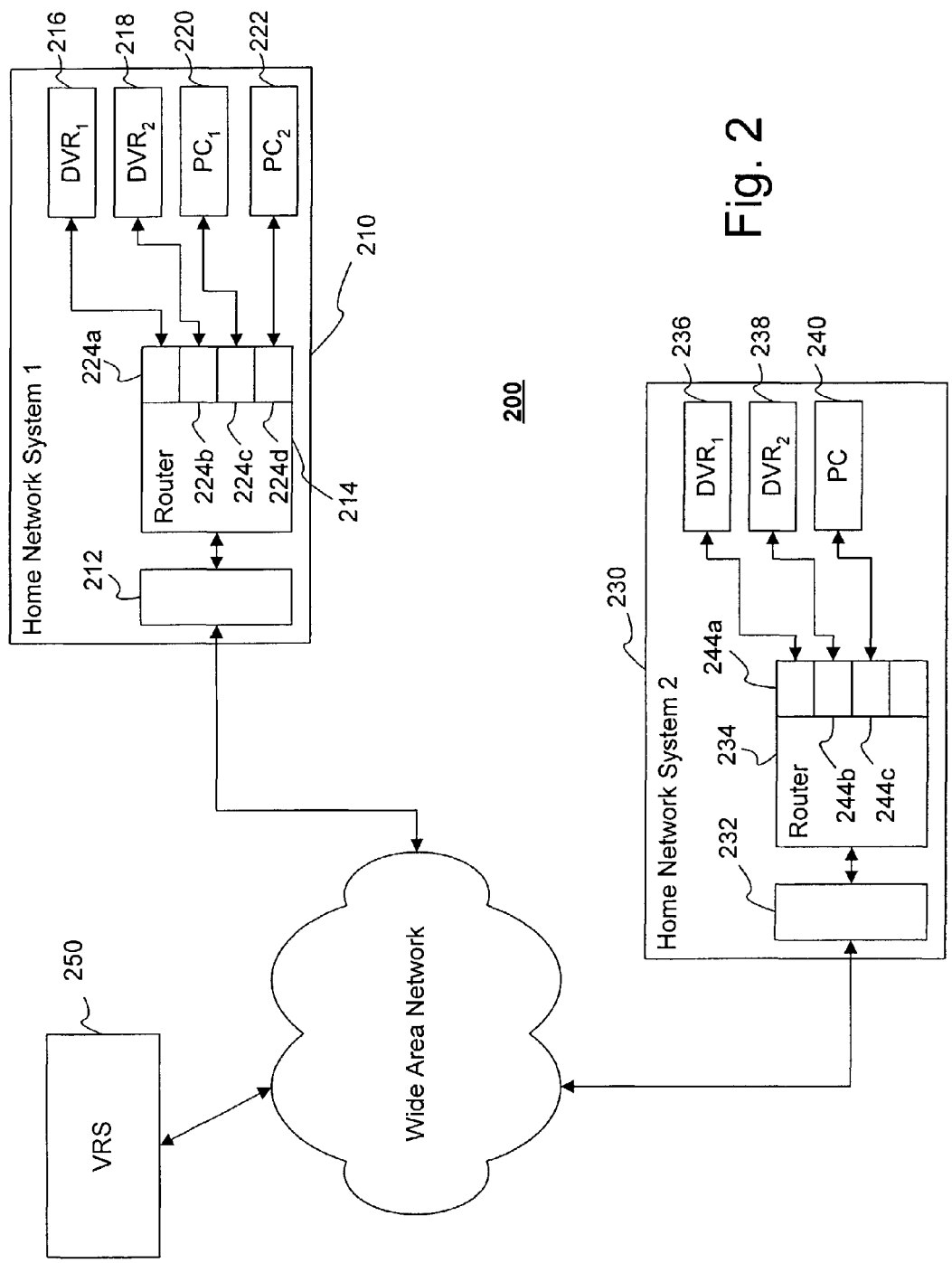

| CP_Name | | | | |
|---|---|---|---|---|
| 2 minutes guaranteed at medium quality. Red Dog gets up too early and is too sleepy to end his six month slump. | | | | |
| ⇧ CP_Name | Downloads | Movies | Sitcoms | Sports ⇧ |
| Red Dog Rising | Red Dog gets up too early | | | |
| Cool Films | Cool Spools - spoofs of great movies | | | |
| Super Heroes | Super Heroes tangle with Super Villains | | | |
| Bowling Highlights | Bowling Highlights | | | |
| Dogs in Space | The Dogs rescue lost space artifacts | | | |
| Ornaments | Ornaments | | | |

Fig. 9a

NETWORK VIDEO UNIT

CROSS REFERENCE TO RELATED APPLICATIONS

This application claims priority under 35 U.S.C. §119(e) to U.S. Provisional Application No. 60/313,718, filed Aug. 19, 2001 and entitled "Network Video Unit," which is incorporated by reference herein in its entirety.

This application is related to application Ser. No. 10/124,064, filed on Apr. 16, 2002 and entitled "Resolving Recording Conflicts", application Ser. No. 10/124,190, filed on Apr. 16, 2002 and entitled "Accessing Programs Using Networked Digital Video Recording Devices", application Ser. No. 10/124,506, filed on Apr. 16, 2002 and entitled "Improved Guide Content Management", and application Ser. No. 10/124,583, filed on Apr. 16, 2002 and entitled "Methods and Apparatus for Sending Content between Client Devices", each of which is incorporated by reference herein in its entirety.

BACKGROUND OF THE INVENTION

1. Field of the Invention

This application relates generally to digital content recording, and more particularly to systems, methods and apparatus in which a content provider transmits content to receiving terminals through a computer network.

2. Description of the Related Art

Technologies for distributing content such as videos and music through a computer network have begun to proliferate. One example of a system that allows users to access and provide audio content operates in an Internet environment and implements a directory file server. There, a user of a client device searches among titles found in a directory. The user selects discovered titles, and the server brokers the downloading of a selected title to the client device from another client device connected to the server. In this arrangement, the users of the storing and seeking devices are typically unknown to each other, connected only by the commonality that one user has a piece of content that the other discovered from the server directory.

One problem with this type of system is that a user must generally search a directory in order to obtain content. The source of the content typically remains anonymous to the receiving party, and thus reliability and quality of the content are generally unpredictable. Users therefore rely upon trial and error to acquire a satisfactory targeted piece of content. Finally, some directory file server based systems allow unfettered copying of content among anonymous parties. Accordingly, the directory file server based system for obtaining content remains undesirable in many aspects.

Conventional content distribution systems are also poorly defined and difficult to use. While a user may be very familiar with navigating among available broadcast content through a programming guide or the like, finding content through a computer network can be difficult. General searches for content using search engines or other conventional vehicles produces results that are of unknown origin. Additionally, search results and corresponding selections can be difficult for the user to manage. Finally, the quality of recordings, the legitimacy of the distribution network and the corresponding recordings, and other aspects of these systems may be lacking.

Furthermore, systems that allow content providers to distribute content to a group of users having similar devices have traditionally been either overly or inadequately restrictive as to the sources of content. Specifically, some systems allow any provider of a particular format to provide content to users, whereas others require users to use an inflexible, fixed set of providers.

What is needed is a flexible content distribution system that allows users to readily connect with a modifiable yet controllable set of content providers. Further needed is content distribution that coherently and conveniently conveys the availability of content on a user's device.

SUMMARY OF THE INVENTION

The present invention allows a content provider to provide content to content playing devices through a computer network in a manageable and coherent manner, and allows centralized control over the set of available content providers, with the ability to flexibly update the set of approved content providers.

Although a digital video recorder (DVR) is a preferred content playing device, the present invention is not necessarily limited to DVRs, and use of the term DVR for ease of description should not be interpreted as a limitation on application of the present invention.

The DVR can be used to browse and select video content from a web site, which is subsequently downloaded to the DVR. The downloaded content can be selected for viewing based upon selection from a guide that also displays traditionally available broadcast content. Alternatively, a user may hold an account or may otherwise interact with a content provider from which selections are made, upon which the selected content is downloaded to the DVR. For example, a user may operate a personal computer to navigate to a content provider website. They could then make content selections that would be downloaded to their DVR.

According to one aspect, a server maintains a database correlating contact information to DVRs in its network. An example of the contact information is the IP address and port through which the DVR can receive content. A DVR will have a unique identifier, and the server associates the contact information to the DVR using the identifier.

The identifier for a user's DVR is also provided to the content provider through a registration process or the like. A user can subsequently navigate to the content provider's web site, provide login information, and select a piece of content. The content provider uses the identifier that was obtained during registration to query the server for current contact information for the DVR. The server then examines its database and returns contact information specific to the particular DVR. The content provider and DVR then communicate to schedule a downloading of the piece of content, and the piece of content is transmitted to the DVR according to the determined schedule.

According to another aspect, the content provider transmits a set of content identification information that automatically populates a content guide at the receiving device with an entry corresponding to the requested piece of content. The entry can also be categorized under a label corresponding to the content provider, which allows efficient organization of the user's various available content. The entry also allows the user to confirm, interrupt, resume and cancel a download of the content as desired.

According to still another aspect, a server automatically updates numerous content receiving units to which it is connected with the labels of approved content providers and thereby manages the addition of new content providers and the corresponding content guide updates. Once a unit is updated, its content guide will reflect the new content provider in a specified category, and will allow the user to navigate among content available at the new content provider and select such content for downloading as described.

BRIEF DESCRIPTION OF THE DRAWINGS

These and other more detailed and specific features of embodiments of the present invention are more fully disclosed in the following specification, reference being had to the accompanying drawings, in which:

FIG. 2 is a schematic diagram illustrating such a DVR connected in a home network environment.

FIGS. 9A-9B are flow diagrams illustrating an embodiment of a content guide having content distribution features in accordance with the present invention.

DETAILED DESCRIPTION OF THE INVENTION

In the following description, for purposes of explanation, numerous details are set forth, such as flowcharts and system configurations, in order to provide an understanding of one or more embodiments of the present invention. However, it is and will be apparent to one skilled in the art that these specific details are not required in order to practice the present invention. Thus, for example, although a DVR having particular features is described in connection with a preferred embodiment, the present invention is equally applicable to other devices and environments, including but not limited to any network enabled device.

Figure 1:
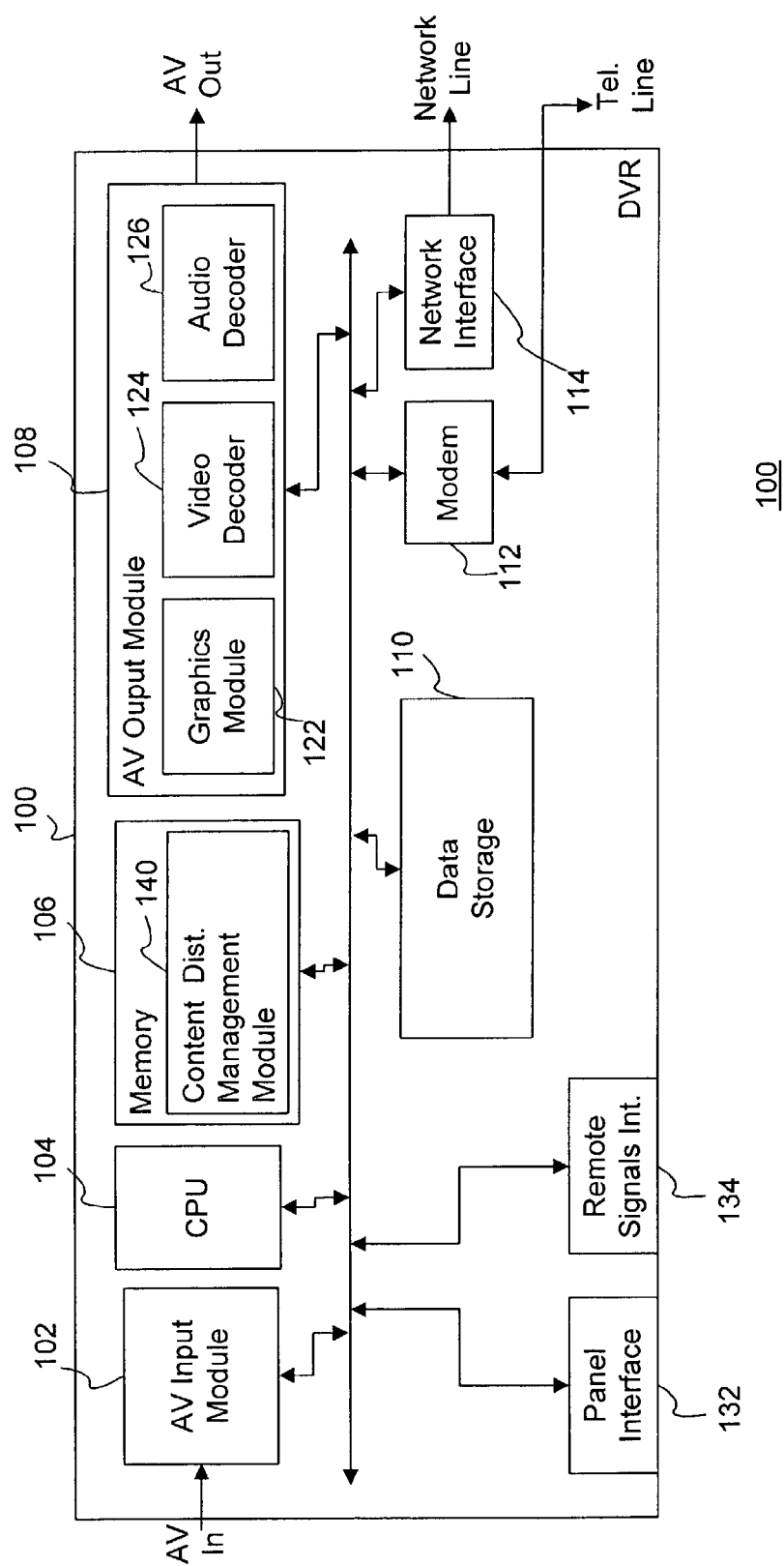
FIG. 1 is a block diagram illustrating an embodiment of a digital video recorder (DVR) configured to include content distribution management in accordance with the present invention.

The block diagram of FIG. 1 illustrates a DVR 100 configured to include content distribution management in accordance with the present invention. The DVR 100 includes an AV input module 102, CPU 104, memory 106, AV output module 108, data storage 110, modem 112 and network interface 114 interconnected by a conventional bus architecture. Generally, the CPU 104 executes instructions such as those stored in memory 106 to provide functionality including that provided by certain embodiments of the present invention. Additional memory such as ROM and/or EEPROM (not shown) may store instructions for boot up sequences, DVR functionality updates, or other information. The network interface 114 is conventional and preferably allows connection to an Ethernet based network. This connection may be used to connect to a home network and in turn a broadband connection to a WAN such as the Internet or any of various alternative broadband connections. In addition to traditional broadcast and other input AV signals, the broadband connection may also source content that is shown and recorded in accordance with the present invention. Although broadband is preferred for distribution of content, "dial-up" connections using the modem 112 and telephone line can also be used.

The user controls the operation of the DVR 100 through control signals initiated from the exterior of the DVR 100 housing through the panel interface 132, or through control signals originating from a remote control, which are received through the remote signals interface 134, in conventional fashion.

The AV input module 102 receives input through various conventional interfaces, including coaxial RF/Ant, S-Video, network interfaces, and others, which need not be shown for an understanding of this invention. The received signals can originate from standard NTSC broadcast, high definition (HDTV) broadcast, standard cable, digital cable, satellite, Internet, or other sources, with the AV input module 102 being configured to include appropriate conventional tuning and/or decoding functionality. The DVR 100 may also receive input from other intermediary devices, such as a set top box that receives one signal format and outputs an NTSC signal or some other conventional format.

The AV input module 102 also preferably includes one or more MPEG encoding modules that convert signals from a first format (e.g. analog NTSC format) into an MPEG format (e.g. MPEG 2, etc.) that may be stored in the memory 106 or data storage 110 medium such as a hard disk. Where necessary, an inbound signal may be converted to an intermediate format prior to MPEG encoding. For example, a digital signal may be intermediately converted to an NTSC signal that is ultimately MPEG encoded. The artisan will recognize the alternatives. Typically, content corresponding to the formatted data stored in the data storage medium 110 may be viewed immediately, or at a later time. Additional information may be stored in association with the MPEG data to manage and identify the stored programs.

The AV output module 108 further includes a graphics module 122, video decoder 124 and audio decoder 126. The video decoder 124 and audio decoder 126 are preferably MPEG decoders that can obtain the MPEG data stored in the data storage medium 110 and convert it to format compatible with the display device, typically the NTSC format that can be readily received by a conventional television set. The graphics module 122 receives various guide and control information and provides signals for corresponding displays, outputting them in a compatible format.

The DVR 100 processes guide information that describes and allows navigation among content receivable by a system (e.g. the broadcast system) at present or future times, as well as content that has already been captured by the DVR 100. Guides that display such information may generally be referred to as content guides. These content guides include channel guides and playback guides. A channel guide displays available content from which individual pieces of content may be selected for current or future recording and viewing. In a specific case, the channel guide lists numerous broadcast television programs, from which the user makes selections for recording. The playback guide displays content that is stored or immediately storable by the DVR 100. Other terminology may be used for the guides. For example, they may be referred to as programming guides. The term content guide is intended to cover all of these alternatives.

Content guides are variously navigable using conventional (e.g., remote) control signals, including those that provide directional navigation, such as by arrows or trackball, joystick or the like, and corresponding selection. In certain modes, selection of an entry is accomplished by merely navigating to the entry. In other modes, selection follows pressing a separate control button or the same control that was used for directional navigation. The various alternatives for navigating the content guide will be readily recognized by the ordinarily skilled artisan.

The DVR 100 may also be referred to as a Personal Video Recorder (PVR). One example of a DVR 100 configurable to incorporate embodiments of the present invention is the ReplayTV brand of DVRs provided by SONICblue Incorporated, a Santh Clara, Calif. company. A Replay Guide is an example of a playback guide implemented by ReplayTV DVRs.

Although certain modular components of a DVR 100 are shown in FIG. 1, the present invention also contemplates and encompasses units having different features. For example, some devices may omit features such as the telephone line modem, instead using alternative conduits to acquire guide data or other information used in practicing the present invention. Additionally, some devices may add features such as a conditional access module (CAM), such as one implementing smart card technology, which may work in conjunction with certain content providers or broadcasters to restrict access to content.

Additionally, although this embodiment and other embodiments of the present invention are described in connection with a DVR or PVR, the invention is equally applicable to other devices including but not limited to a set top box (STB), cable STB, satellite STB, or televisions containing modules with similar functionality.

The DVR memory 106 is configured to include conventional Internet browsing capabilities. For example, the browsing capabilities may be comparable to those provided by Internet Explorer, as provided by Microsoft, Inc. of Redmond Wash. The memory 106 is also configured to include an embodiment of a content distribution management module (CDMM) 140. The user operates the DVR 100 to browse content available from online content providers. In order to select content from a web site the user must first provide the content provider with information specific to their DVR 100, including a unique identifier known as the ISN (Internet Serial Number). For example, the user enters this information when they register with the content provider. The content provider stores the unique identifier for each user that registers and uses it to obtain 'contact' information such as the IP address and port of the specific DVR 100 when it wishes to schedule content for download. With the contact information, the content provider can communicate, to the DVR, information pertaining to content that it wishes to be downloaded. One way that the content provider obtains the contact information is to query a server having the information using the ISN, whereupon the contact information is returned. In this embodiment, the DVR 100 may periodically report its contact information to the server that maintains the contact information.

After the user's selection of a piece of content, the CDMM 140 receives a request to schedule the downloading of the piece of content to the DVR 100. The announcement of the available piece of content preferably identifies the content and indicates the amount of storage space that it will require. The CDMM 140 responds to the announcement by allocating storage space for the download and where appropriate scheduling the download. The CDMM 140 downloads the piece of content from a specified location and provides status feedback to the content provider through completion of the download.

The CDMM 140 also automatically populates the DVR 100 content guide with information about the selected piece of content once the user selects it. The populated content guide is preferably the same content guide that is used to display recorded broadcast programs and the like that are otherwise selectable and viewable through the DVR 100. A further preferred content guide includes concurrently displayed category and content areas. The category area displays a list of categories. Selection of a category updates the content area to list programs or other pieces of content pertaining to the category. Thus, selection of a "Sports" category updates the content area to display a list of sports programs available for viewing. Preferably a category corresponding to the content provider is provided and included in the list of categories. A preferred category label is the name of the content provider, but it can be a logo or other symbolic or alphanumeric representation as well. Automatic population of the guide provides an entry in the content guide that is displayed in the guide's content area when the "content provider" category is selected.

The DVR 100, configured to include the CDMM 140, preferably also allows various operations on an entry once it resides in the content guide, such as suspending or resuming a download of the piece of content, playing the piece of content for viewing, or deleting the piece of content from the content guide.

The CDMM 140 also includes instructions that allow the content guide categories to be updated through a network connection to a server. Thus, a server can maintain a list of approved content providers, and category labels for the approved content providers can be periodically downloaded to DVRs 100 that are in network communication with the server. Preferably, push or other conventional technologies are used to automatically update the DVR 100 content guides to include the new category label. This allows centralization of content provider approval, and is very user friendly, as the new category will simply appear in the user's guide without requiring the user to go through a complex set of operations to update the guide to include a newly approved provider.

In an alternative to the above, a DVR guide can be automatically populated with entries from which content can be selected. The entries may respectively appear under a series of particular content providers, and may also be otherwise organized, such as by genre and type. For example, if a user registers with a particular content provider, that content provider may provide the information about available downloads to the DVR automatically without requiring the DVR user to navigate to the content provider to browse a full listing of available titles.

In either alternative, when a piece of content is selected from the guide, the content provider preferably queries the server having the current contact information for the DVR, and then provides the DVR with information regarding the content to be downloaded. This information may include download priority preferences that the DVR uses to schedule the download of content. The DVR subsequently downloads the selected content and stores it for playback, with the guide preferably updating to indicate immediate availability.

The schematic diagram of FIG. 2 illustrates an example of a home network based system 200 in which embodiments of the present invention may operate. Various devices including a number of DVRs 216, 218, 236, 238 and PCs 220, 222, 240 communicate with a video replay server (VRS) 250 or each other using the wide area network. Home network system 210 is shown to include a broadband interface 212 and a router 214, through which two DVRs 216, 218 and two PCs 220, 222 connect to other devices on the wide area network, such as the VRS 250. Preferably, the wide area network is the Internet. The broadband interface 212 may be a conventional digital subscriber line (DSL) modem, cable modem, or any device providing an interface between the home network and a broadband connection, including wired, wireless and any alternative broadband connections. Additional equipment, such as conventional DSL Central Office equipment that interfaces standard twisted pair lines coming from the DSL modem and the Internet is also typically present but need not be shown for an understanding of the invention.

The router 214 acts as a firewall between the devices 216-222 within the home network 210 and other devices potentially connecting with those devices through the Internet. Logical ports 224a-d are assigned for certain Internet communications made between the devices 216-222 and other devices outside the home network 210. These logical ports act as a barrier to certain file transfers. Similar to home network 210, the other shown home network 230 includes a broadband interface 232 and router 234 through which client devices 236-240 may connect to the Internet, using logical ports 244a-c.

The VRS 250 maintains contact information, including the network addresses and port information for devices. Preferably the DVRs periodically and automatically report their contact information to the VRS 250. This allows online content providers to query the VRS 250 for such information, which is then used to complete content downloads. This feature is described further in connection with FIGS. 4-6, below.

Figure 3A:
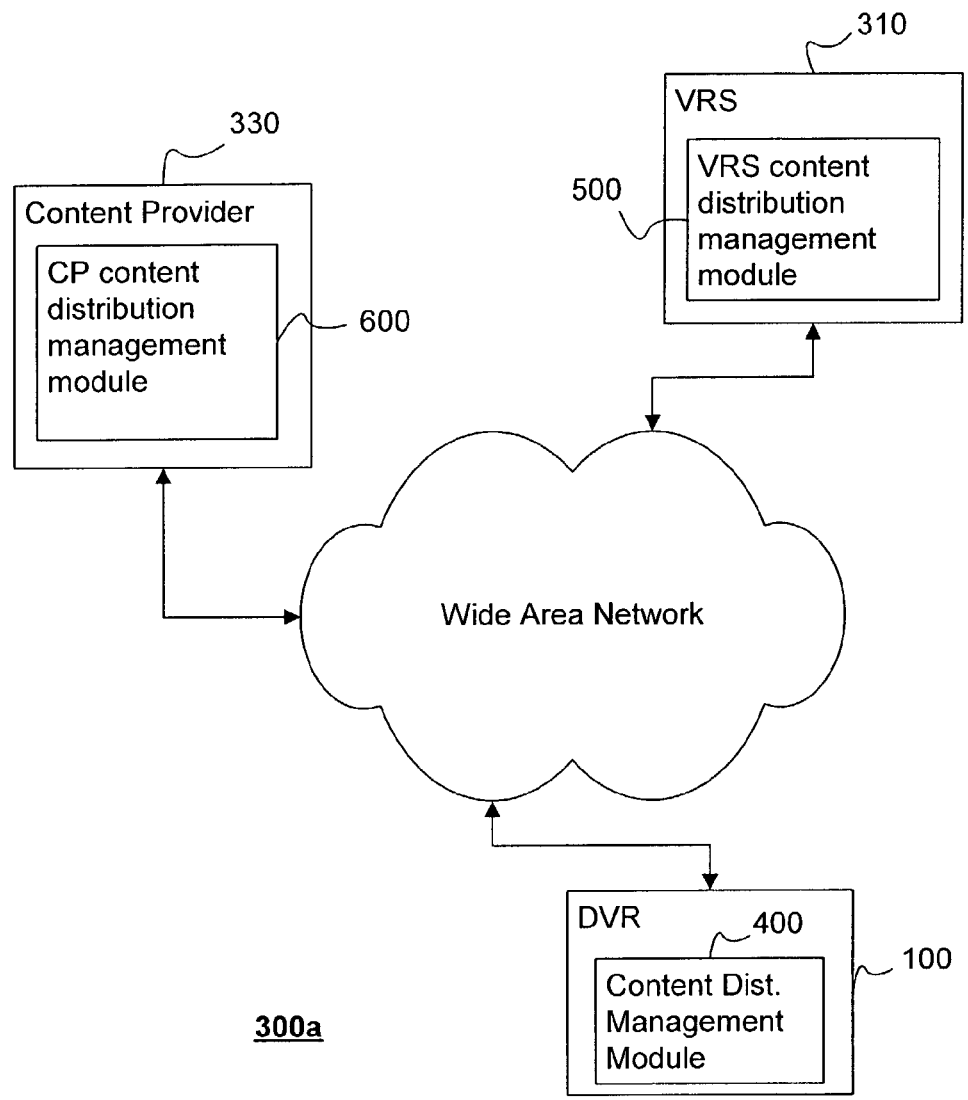
FIGS. 3A-3B are schematic diagrams illustrating examples of systems in which content distribution management operates in accordance with the present invention.
Figure 3B:
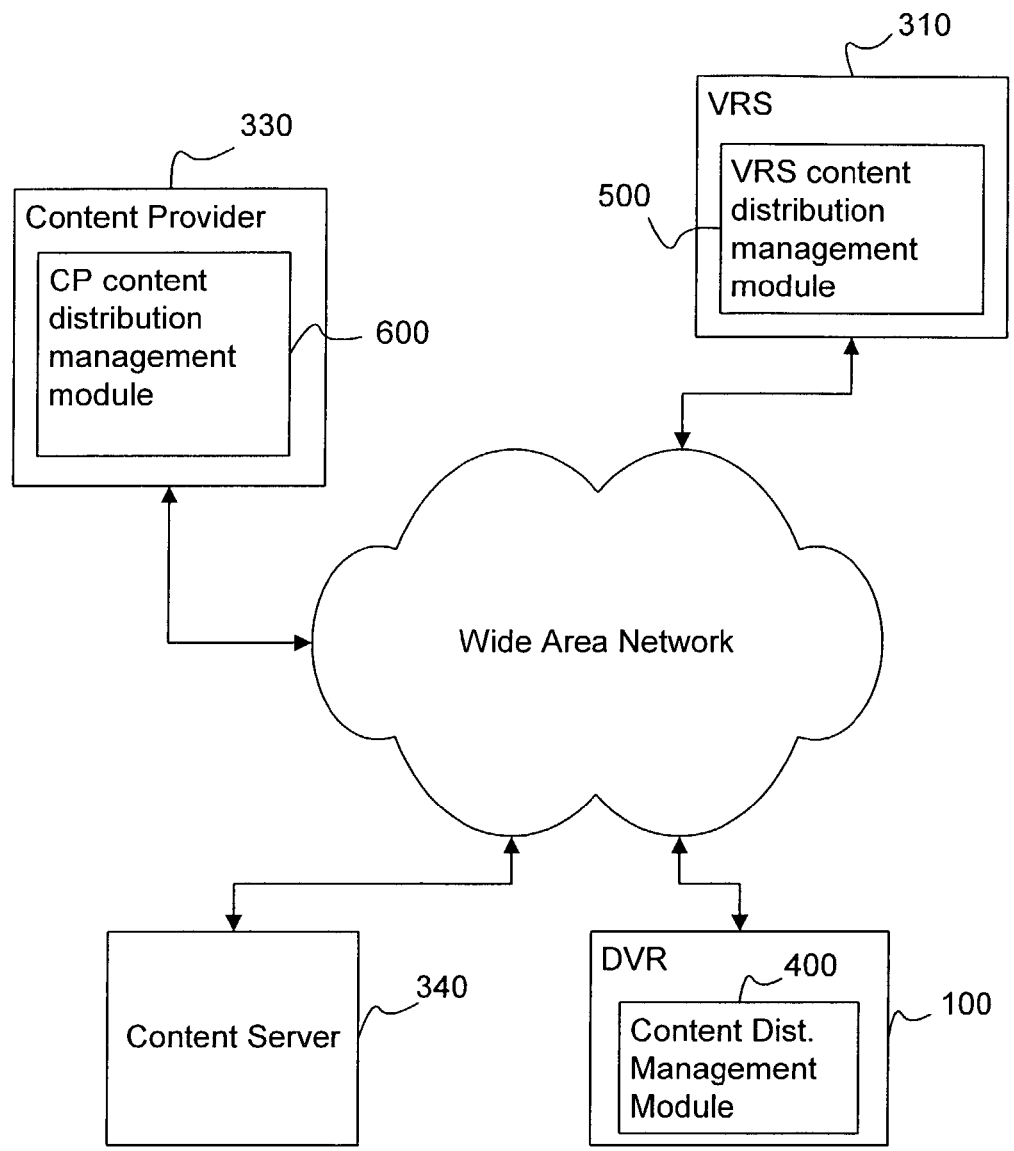

FIGS. 3A-3B are schematic diagrams illustrating examples of systems 300a, 300b in which content distribution management operates in accordance with the present invention. Particularly, a DVR 100, VRS 310, and CP 330 are connected to a Wide Area Network such as the Internet. As described, a user operates the DVR 100 to browse content listings provided by the content provider (CP) 330. The user may select the content directly from a content guide on the DVR 100, or via a browser on the DVR 100 or other browser-enabled device such as a PC. The CP 330 receives a request for a piece of content, and then uses an identifier to query the VRS 310 for contact information relevant to the requesting DVR 100. The contact information is then used to report the availability of the piece of content to the DVR 100 and to schedule a transmission of the content, preferably via download, alternatively via streaming or other processes, to the DVR 100. The download may be directly from the CP 330 to the DVR 100, as shown in the system 300a of FIG. 3A, or through a separate content server (CS) 340, as shown in the system 300b of FIG. 3B. The DVR 100, CP 330 and VRS 310 respectively include content distribution management modules 400, 500, 600 that facilitate providing content in accordance with the present invention, as described further below, in connection with FIGS. 4-6.

Figure 4:
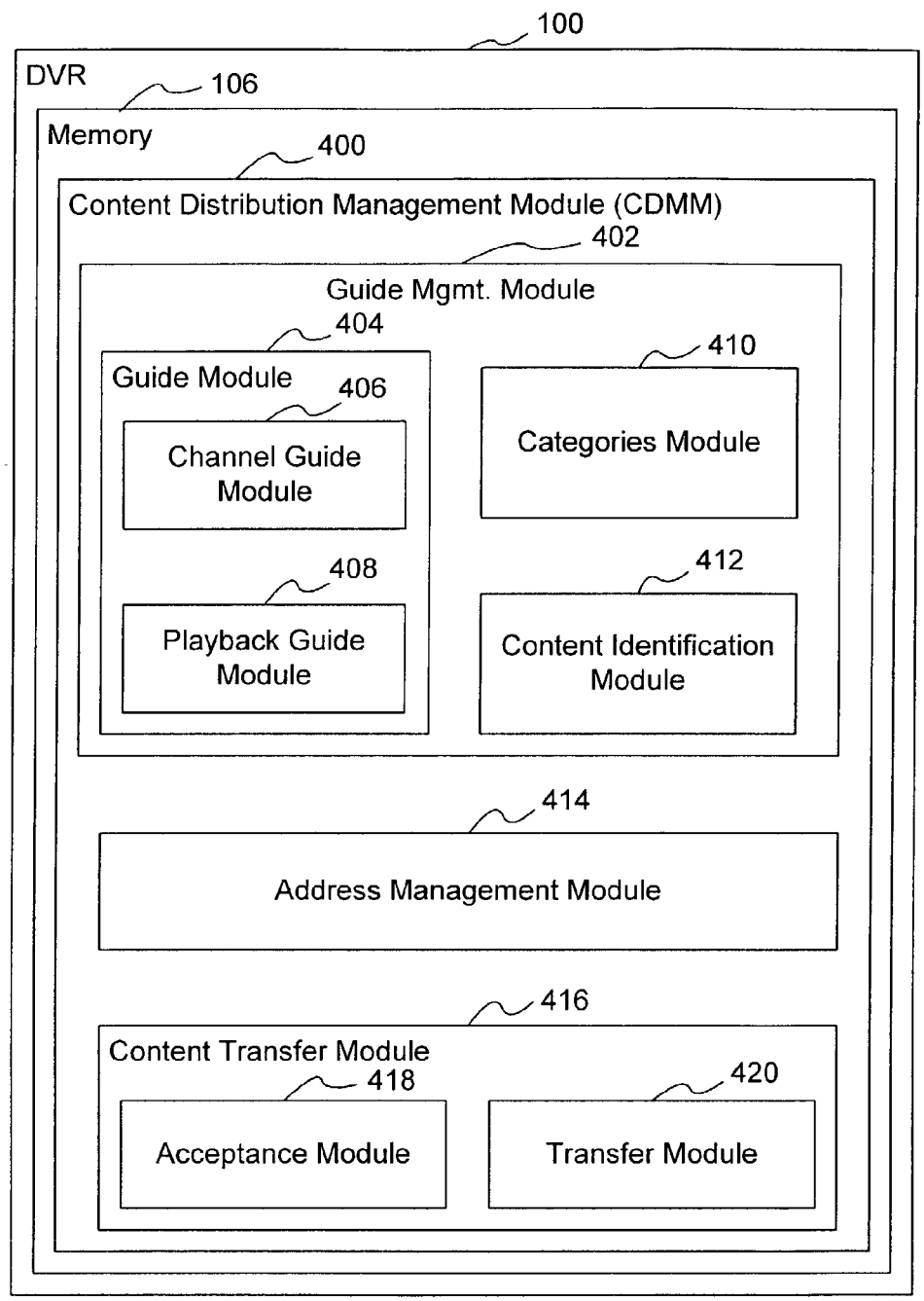
FIG. 4 is a block diagram illustrating an embodiment of a DVR content distribution management module in accordance with the present invention.

FIG. 4 is a block diagram illustrating an embodiment of a DVR CDMM 400. The CDMM 400 includes a guide management module 402, an address management module 414 and a content transfer module 416.

Generally, the guide management module 402 provides content guides and corresponding displays, and identifies categories and content to be included in those guides. The guide module 404 provides the content guide format including the previously introduced content and category areas, as well as the functionality of navigating the various areas. The channel guide module 406 and the playback guide module 408 respectively provide the remainder of the channel and playback types of content guides. Particularly, the channel guide includes programs that are or will become available for recording, and the playback guide includes programs that have been recorded or have been selected for recording. The display diagrams of FIGS. 9A-9B, described below, are examples of a content guide provided by the guide management module 402.

The categories module 410 retains the list of available categories. Preferably, a number of default and custom user categories are provided. Examples of default categories are Family, Kids, Movies, News, Sports, and TV Shows. The custom categories can be named by the user, or can be automatically provided, such as through VRS driven updates provided through a network or phone based modem connection. Among the custom category names are those of approved content providers. Of course, some previously approved content providers can appear among the original "default" category listings. The ordinarily skilled artisan will readily recognize the alternatives, including the number of overall and default categories. The categories module 410 also provides interfaces for introducing the names of new categories.

The content identification module 412 includes routines for identifying programs and providing corresponding interfaces. Preferably the content identification module identifies programs to be recorded and provides interfaces for assigning the recorded programs to a selected category. The user may navigate a channel guide to identify a program for recording or may navigate to the content provider to see a listing of programs. The content identification module 412 preferably invokes the browser to facilitate navigation to the web site of the online content provider. A conventional HTML based link that automatically navigates to an approved content provider may also be provided. These links can be provided in a screen that is separate from the content guides. Alternatively, the content provider label in a category listing in a Playback guide may be associated with an URL such that selecting the label automatically navigates to the content provider web site.

The address management module 414 maintains a unit identifier, network IP address and port information for the DVR 100 and includes instructions for periodically reporting the network address and port information to the VRS. The address management module 414 also includes routines for allowing the DVR 100 to communicate with and identify other DVRs and may also include an address book module (not shown) to display address book based information about other DVRs and their users.

Finally, the content transfer module 416 generally includes routines for transferring content and, particularly, receiving content from online content providers directly or through related fulfillment servers. The content transfer module 416 includes an acceptance module 418 having routines for responding to the indication of available content. The response includes an allocation of storage for the incoming content, which can be an examination of the space available on the hard disk, and a scheduling of a download where the content is coming from an online provider. The transfer module 420 has routines for actually transferring or receiving the content into the DVR 100. Particularly, when a user requests a piece of content from the content provider, the content provider responds by sending a set of information to update the user's content guide to include an entry for the requested content, and sends a transfer request that prompts automatic allocation and scheduling of a download if space is available. Conventional file transfer technologies such as the File Transfer Protocol (FTP), HyperText Transfer Protocol (HTTP) and others can be used to effectuate the transfer.

Figure 5:
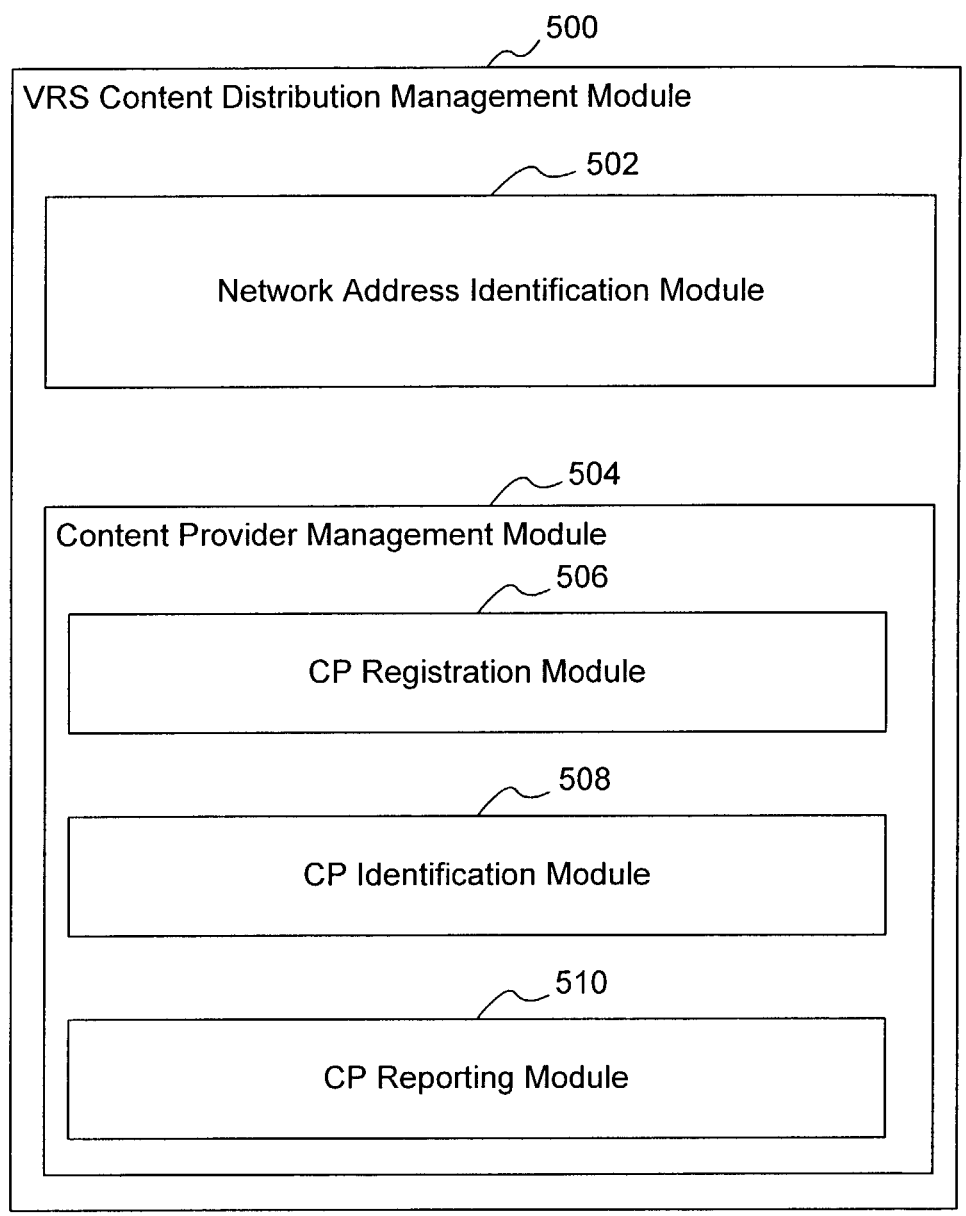
FIG. 5 is a block diagram illustrating an embodiment of a VRS content distribution management module in accordance with the present invention.

FIG. 5 illustrates an embodiment of a VRS CDMM 500 configured in accordance with the present invention. The VRS CDMM 500 includes a network address identification module 502 that identifies DVRs over which it has jurisdiction (e.g., those on its network segment or the like) and maintains contact information such as the network IP address and port information for the identified units. The network address identification module has routines for receiving reports from the DVRs regarding such information. The DVRs communicate with the VRS using HTTP or other conventional protocols, which prompts the VRS to update the contact information. Similarly, the CP can query the VRS through an HTTP connection to obtain contact information for a DVR whose user has requested a piece of content. Communications between the VRS, CP and DVR can also implement a secure protocol such as SSL.

The VRS CDMM 500 further includes a content provider management module 504 that includes a CP registration module 506, CP identification module 508 and CP reporting module 510. The CP registration module 506 includes instructions for allowing content providers to register and seek approval for providing content to DVRs associated with the VRS. Conventional menus are used to gather the information from a representative of the content provider. Various approval schemes can be implemented, ranging from automatic approval to one that requires a formal review process. The content provider will preferably provide a label under which their content will be categorized, which is referred to as CP_Name below. The CP identification module 508 retains a list of approved content providers and information about the approved content providers including a corresponding URL used to connect with a web site of the content provider and the content label. Periodically, the CP reporting module 510 updates the content provider list for its associated DVRs by reporting a new list of approved content providers and their corresponding labels and URLs. Conventional techniques, including a push technique wherein the DVRs actually implement an HTTP based request for the information, can be used to effectuate the update. The DVR CDMM includes routines to update the guide and other functionality of the DVR to adopt the new content providers, as previously described.

Although one embodiment of a VRS CDMM 500 is described, there may be alternatives, and equivalent functionality may be provided through more or less modules than those shown. Additionally, two modules shown on one "server" may equally reside on separate servers. For example, although the network address module and the content provider management module are shown to reside on the same server, they can be provided on separate servers and do not necessarily need to be part of the same system. This may in fact be desired, as the content provider management module might be desirably inaccessible by third parties, whereas the network address module should be accessible so that contact information can be distributed as needed.

Figure 6:
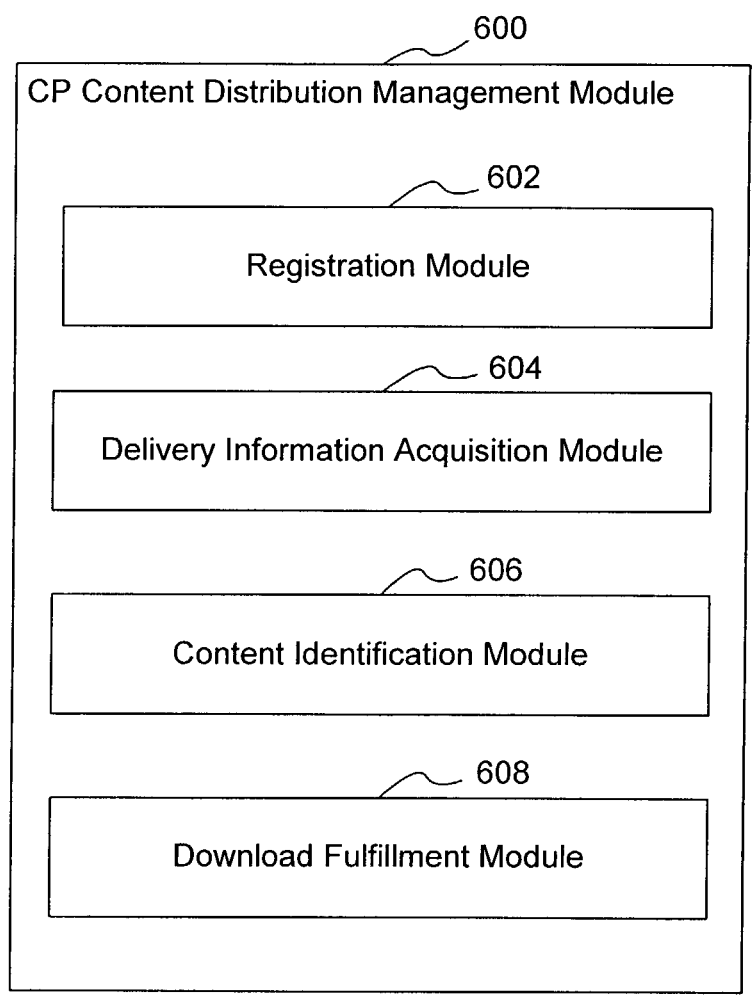
FIG. 6 is a block diagram illustrating an embodiment of a CP content distribution management module in accordance with the present invention.

The block diagram of FIG. 6 illustrates an embodiment of a CP CDMM 600 configured in accordance with the present invention. The CP CDMM 600 includes a registration module 602, a delivery information acquisition module 604, a content identification module 606 and a download fulfillment module 608. The registration module 602 includes instructions for interfacing with new users to obtain their registration information, approving such new users, and managing a database of approved users. For example, when a DVR user navigates to the CP web site corresponding to the hyperlink found in the DVR for the first time, they are provided with a registration interface that collects information about the user. Various types of information and corresponding information management strategies can be provided, but preferably the Internet Serial Number (ISN) and Serial Number (SN) found on a label on the outside of the DVR housing are collected in one embodiment. Preferably the ISN is the identifier to which the contact information maintained by the VRS is indexed. Requesting the SN provides added security, as it is typically known only be reading a label found on the back of the DVR unit. It may be preferable for security purposes to have the user manually enter information such as the SN. However, particularly where the user is accessing the content provider web site via the DVR, the DVR can also be programmed to automatically complete the required fields with the ISN and SN information, easing the information entry burden on the user.

A registered user can logon to the CP web site using conventional approaches, including those that automatically identify the user, such as through cookies or the like. The user then navigates among available content and select various pieces that they would like to download or otherwise transmit to their DVR. The content identification module 606 tracks the selected pieces of content and packages content identification information for such content using a format that is recognized by the DVR. Preferably, the content identification information conforms to a meta-data format that is also used to otherwise populate the DVR content guides, as is described further below.

The delivery information acquisition module 604 includes instructions for obtaining the network address and port information for a DVR requesting content. Preferably, the ISN for the DVR is reported to the VRS, which returns the current network address and port for the DVR.

Finally, the download fulfillment module 608 includes instructions that allow the DVR to schedule a download of a selected piece of content from the CP to the DVR. This may include receiving a request to download content from the DVR, communicating with the DVR to schedule the download, and transmitting the piece of content from the CP to the receiving DVR. The CP may store the piece of content and send it directly to the DVR using a conventional file transfer technique such as HTTP or FTP or may utilize a secure protocol such as SSL. Alternatively, the CP works in conjunction with a fulfillment site or content server (CS) (also known as Content Delivery Networks (CDN)) such as provided by speedera.com, akamai.com, or others.

Figure 7A:
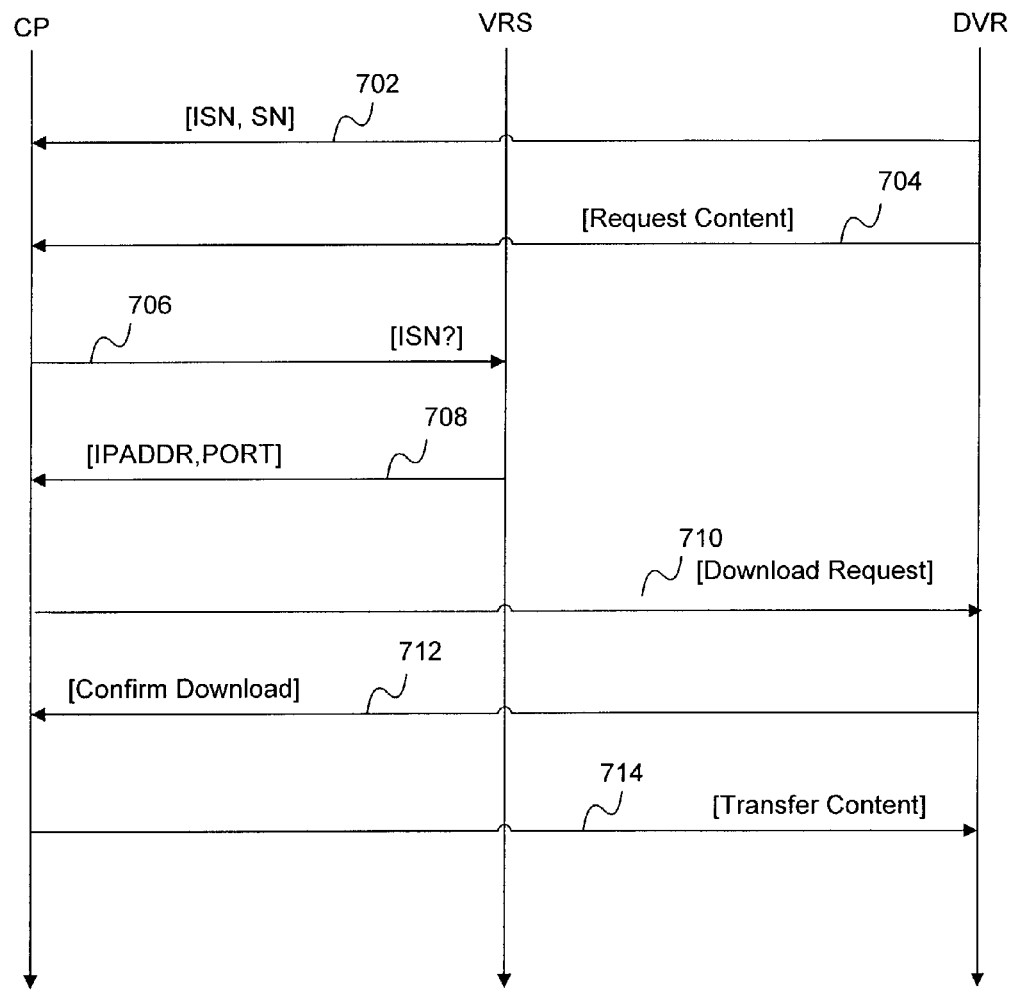
FIG. 7A is a flow diagram illustrating an embodiment of distributing a piece of content to a DVR through an online content provider.

The flow diagram of FIG. 7A illustrates an embodiment of providing a piece of content to a receiving device in accordance with the present invention. Particularly, an example of the interaction between the DVR, VRS and CP for sending content from the CP to the DVR is shown. The DVR transmits 702 its ISN and SN to the CP. The information is preferably provided during a registration process and the system can be configured to require input of the ISN and SN information only during registration. The CP then retains the ISN and SN information for the registered DVR, and retrieves the information as needed, such as upon completion of a conventional login procedure by the user (which could be through their DVR, or a separate browser-enabled PC, etc.). Thus, content distribution procedures may not require step 702, particularly after registration.

The DVR also periodically sends its contact information to the VRS. This contact information preferably includes the network address and port information usable to communicate with the DVR. The VRS maintains an association between the DVR (e.g., using the ISN) and its current contact information. At some point, the DVR transmits a request 704 for a piece of content to the CP. For example, the DVR user implements its browsing functionality to navigate among video programs available from the CP web site and selects one or more pieces of content through conventional interfaces. Alternatively, as mentioned above, the request for a piece of content may be originated by other devices, for a previously registered DVR. Specifically, a user can register their DVR, and then subsequently use a PC or other device to access the CP, login using the account information corresponding to the DVR, and make requests for content to be distributed to the DVR, even if they are away from home. Thus, the request 704 need not always be undertaken by the DVR.

After the request for a piece of content is received, the CP obtains contact information for the DVR by transmitting 706 the DVR ISN to the VRS, which queries its database indexing the ISN to the relevant contact information. The contact information (e.g., IP address, port) is then transmitted 708 to the CP.

The CP next transmits 710 a request to download the piece of content to the DVR along with information that updates the content guide to reflect a new entry. This request can be referred to as a notification that the content is available for download. Preferably, the notification identifies the content provider, identifies the piece of content, and provides metadata in a format that is recognized by the DVR content guide module. The notification can be conveyed using a conventional HTTP query to notify that the piece of content (e.g., a film) is available for download, with a response from the DVR confirming receipt of the notification, or a parsing or transfer error in conventional fashion. An example of the notification data includes administration data such as the version number of the data format, the unique content provider ID (CP_ID) for the content provider, an URL used for transaction status, the serial number of the receiving unit, a transaction ID, and the URL indicating the location of the content. The notification data also preferably includes meta data used to populate fields in the DVR content guide. An example of a format for the meta data includes the following fields: title="[title]", filedurationinseconds="[value in seconds]", episodetitle="[name of episode]", description="[textual description of episode]", actors="[list of actors]", director="[director's name]", yearmade="[date]". The various fields have corresponding values or information as indicated. Some or all of these pieces of information are used to populate corresponding areas of the receiving DVR content guide to allow identification and selection of the content corresponding to the entry. This is just an example and the ordinarily skilled artisan will recognize the alternatives.

Since the user has already requested the piece of content, the DVR automatically determines whether sufficient storage is available for the piece of content and allocates storage space to prepare for receipt of the piece of content. The DVR then communicates with the CP to schedule the download, and ultimately confirms 712 the scheduled download. Preferably the CP can accommodate a unilateral DVR request to schedule the download, but an exchange between the two can also be provided to determine the download schedule. Ultimately, the DVR downloads the piece of content 714 from the CP (or CS) using FTP, HTTP, SSL or other known protocols as described previously. An entry for the piece of content also automatically appears in the content guide in association with the content provider, as will be described further below in connection with FIGS. 9A-B.

The confirmation and the exchange that ultimately provides the download can be variously implemented. In a preferred example, the CP receives a response from the query indicating that the notification had been received successfully, then waits until it receives confirmation that the request has been validated, the required amount of disk space has been allocated, and the download has been scheduled. In processing the notification the DVR automatically queries a CGI (e.g. HTTP post) on the CP server using the content provider URL supplied in the notification, which is used to inform the CP regarding the status of the transaction. The query can provide as information the ISN, transaction ID (to track this particular transaction), percentage complete, and status of download (e.g., transaction processed, error, not enough disk space, invalid CP_ID, invalid serial number, download in progress, download complete, download failure), with a return from the CP indicating receipt of the transaction status. In a normal download, the DVR would periodically report that the download was in progress to the CP, with ultimate indication that the download was complete. The various errors and failures could also be reported, with any desired recovery protocol, such as a repeated attempt or the like.

The DVR preferably has autonomy over when the download is actually scheduled, and can thus prioritize other tasks and downloads. If no other downloads are currently in progress, the download can begin immediately. The file or files can also be downloaded in portions or chunks, downloading one portion at a time. There, each portion can be associated with an URL if desired.

Although the DVR can be used to navigate to the CP website and make content selections, upon registering a DVR a user may also use other devices to make the selections. For example, in registering their DVR, a user may be given a login name and password that allows them to login using any device having a browser (e.g., a PC). This information allows the CP to identify the user. As described previously, the CP will already have collected the ISN and SN information for the user's DVR. Although selections are made with such alternative devices, the content is still preferably scheduled and delivered to the registered DVR. This allows the user to conveniently select content while they are not able to directly use their DVR. Thus, for example, a user may use their PC at work to select content to be downloaded to their registered DVR. This could allow them to select content early so that it is available when they return home.

Another way that the user may select content is from a pre-loaded guide that contains a list of content available from one or more content providers. In this case, the user would not be accessing the CP website online, as the guide content would already reside on their DVR. Once the user makes a selection of a piece of content from the guide, the CP is automatically notified, and then the request is handled as though the user had selected the content via the web site as described above.

Figure 7B:
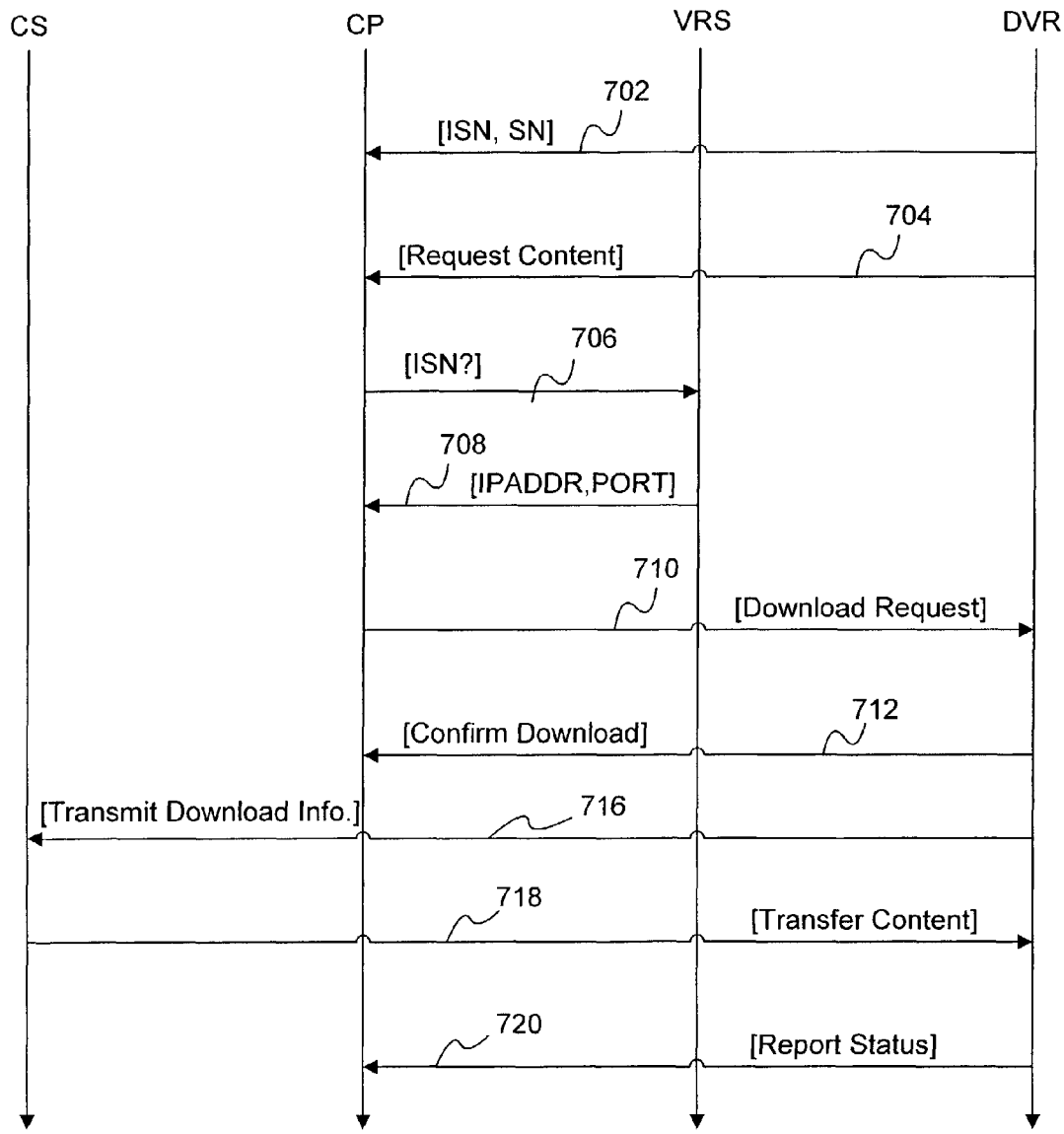
FIG. 7B is a flow diagram illustrating an embodiment of distributing a piece of content to a DVR through an online content provider that invokes a content server to complete a download.

The flow diagram of FIG. 7B illustrates an alternative wherein the DVR user initially navigates among content available at the CP web site, with the download being fulfilled by a separate content server (CS). In this embodiment, steps 702-710 are the same as described in FIG. 7A above. The DVR receives the location (URL) and size (in bytes) of the content in the 710 [Download Request] message. If sufficient space on the disk can be allocated then the DVR sends the 712 [Confirm Download] and queues the content for download. When the DVR starts the download it requests chunks of the file using standard HTTP protocols and the location URL, from the CS, until the entire file has been downloaded (iterations of steps 716 and 718). The DVR reports 720 the status of the download to the CP so that the download can be monitored and logged for billing and the like upon completion. FIG. 7B represents one alternative. The ordinarily skilled artisan will recognize others.

Figure 8:
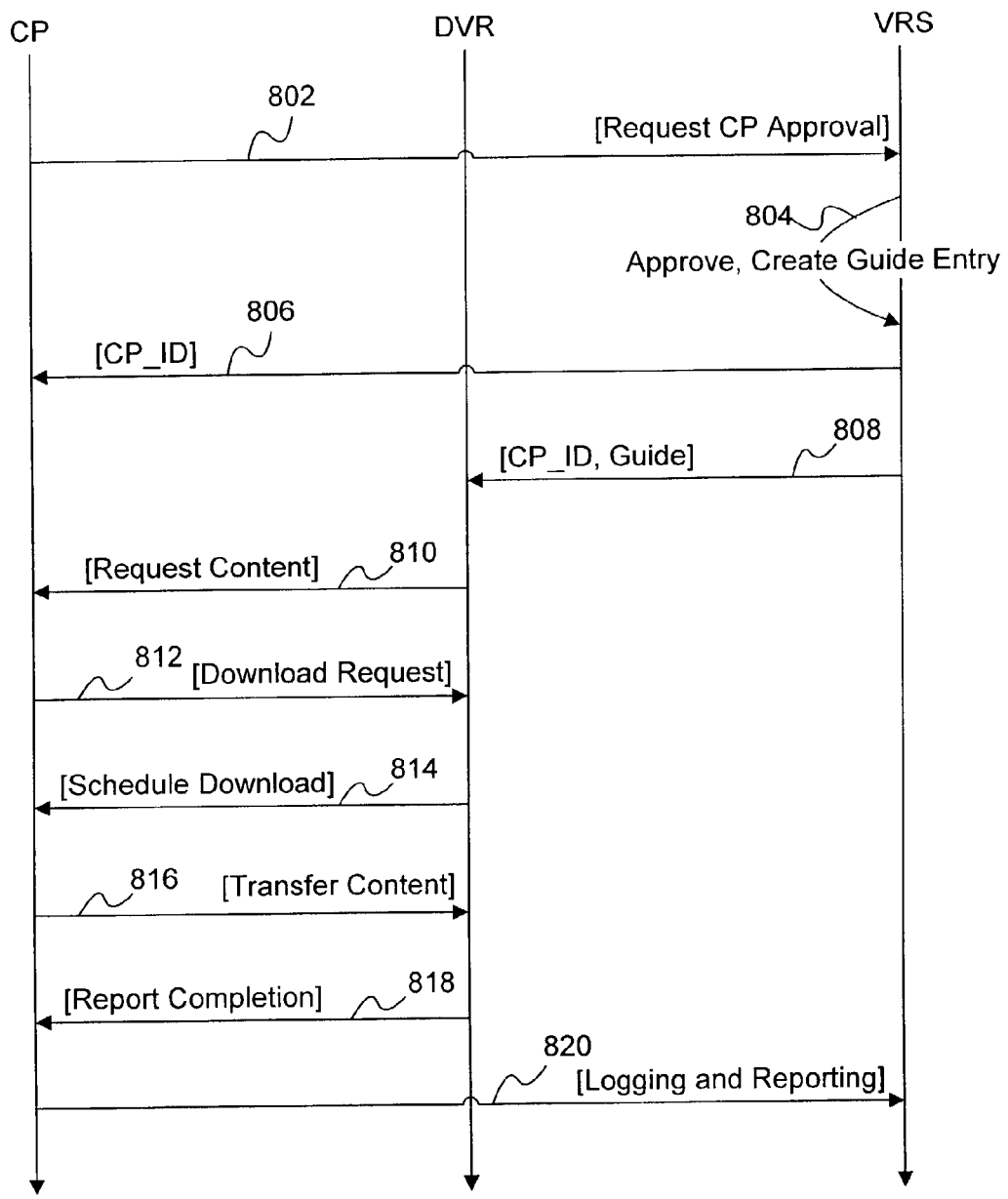
FIG. 8 is a flow diagram illustrating an embodiment of managing content providers and corresponding content distribution in accordance with the present invention.

FIG. 8 illustrates an embodiment of reporting approved content providers to content receiving devices through a computer network, in accord with the present invention. The CP initially requests 802 approval to become a new CP, such as by contacting the VRS through the Internet and completing an online registration form. The request can then be reviewed and, if acceptable, approved 804 by the VRS or corresponding entity, whereupon a guide entry corresponding to the CP is generated and maintained at the VRS. Preferably, the VRS provides a unique ID number for the CP (CP_ID) as well as a label for the CP, which will appear as a category in the DVR content guide. The label can be one that is entered by the CP during registration, so that the CP can control the label under which content will be available. Multiple CP labels can be associated to a single CP as well, if desired.

The VRS transmits 806 the ID number to the CP along with notice of the approval and other information useful in prepping content for distribution in the system. For example, the VRS may provide software and instructions that allows the CP to prepare content descriptions and automatically populate DVR content guides with content identification information once content is selected by a DVR user. The CP may also receive instructions regarding the preparation of content according to a particular format so that the distributed content will be readily recognized by the receiving DVRs. This may be in the form of software that is analogous to that used in the DVR for converting content into the format used by the DVR. Alternatively, pre-prepped content may be provided to approved CPs.

Periodically, the VRS also transmits 808 content provider updates to its associated DVRs. Preferably, the VRS transmits a new CP_Id and corresponding label CP_Name to the DVRs, which then update their content guides to include the new entries. Alternatively, the content provider can be added to a list from which the user may easily make selections in adding active categories to their content guide. In one embodiment, a "Tier 1" CP automatically appears in the guide, and "Tier 2" CPs can be added to the guide, by the user, by selection from a list of Tier 2 providers. Once the CP is set up as an approved provider, the user may request content 810, which causes the DVR content guide to be updated 812, and corresponding download scheduling 814 and transfer of the content 816 as described in connection with FIGS. 7A and 7B. After completion of the download is reported 818, the CP could transmit 820 information to the VRS to log and report the completed download, although this feature may preferably be omitted for privacy reasons.

Figure 9B:
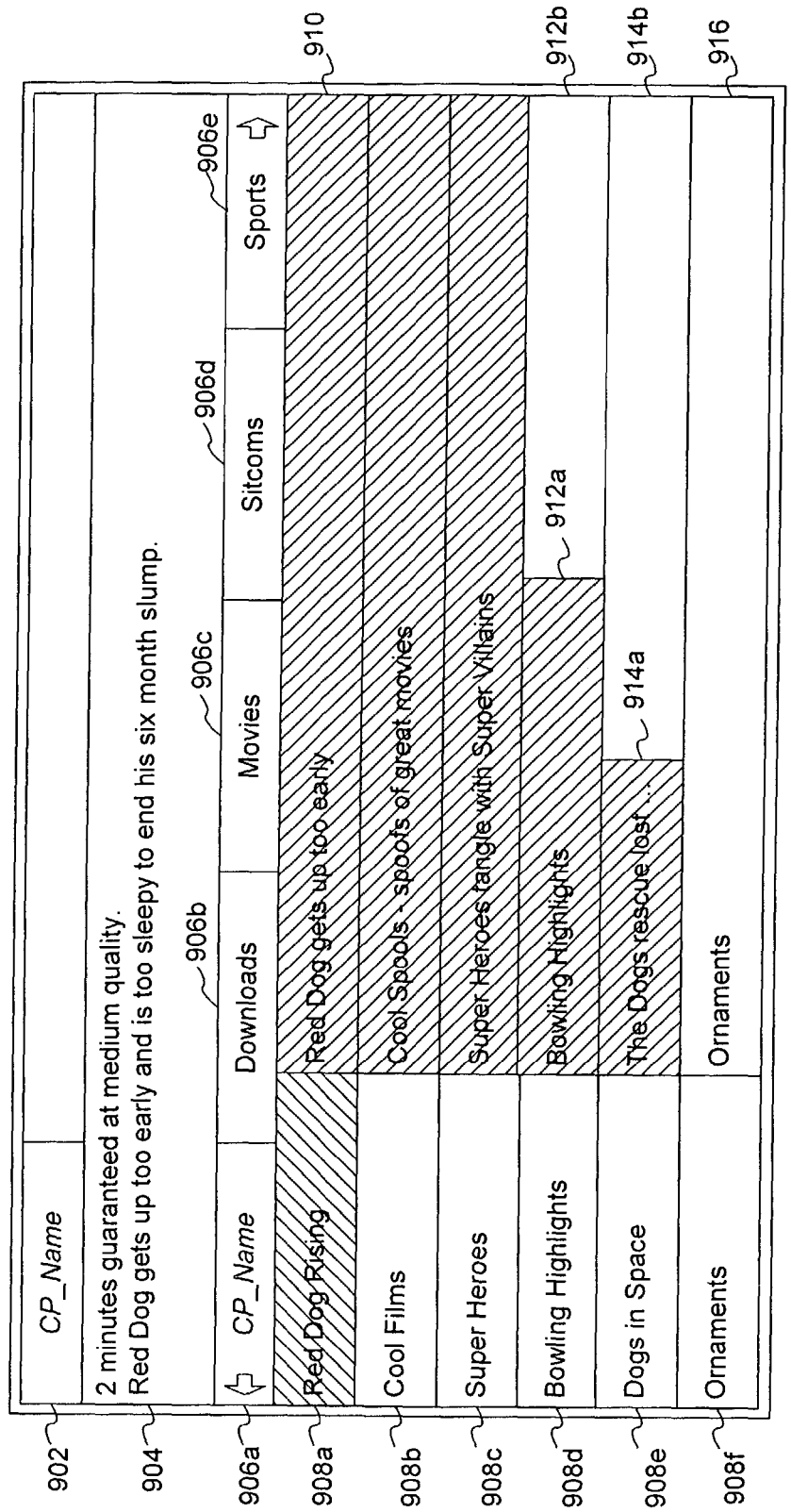

The display diagrams of FIGS. 9A and 9B illustrate an example of a content guide that works in conjunction with content distribution as described above. More specifically, the content guide 900a is a playback guide (e.g., a Replay Guide) that displays content that has been recorded or has been selected for recording. The content guide 900a includes a header 902, a heads up display (HUD) 904, a categories area with several category listings 906a-e, and a content area with several listed programs 908a-f.

The header area 902 displays a currently selected category. Here, the selected category is for an approved content provider, designated by the label "CP_Name". A content provider maintains databases of content and makes them available for distribution to users, and is not necessarily the owner of the content. The content area lists the available programs in the selected category, including the shown entries 908a-f. While in the content area, the user navigates among the available programs using conventional remote control and display signals such as a cursor that moves in response to directional commands and that either automatically selects the underlying entry or does so in response to a selection signal (e.g., a conventional joystick device provides various directional commands and is pressed to "select" a currently highlighted area). The list of programs may exceed the number that can be shown in the content area. Downward cursor navigation beyond the lowermost entry 908f causes un-displayed entries to appear, unless the entry is the last in the category. The HUD 904 displays additional information regarding a currently selected entry. Here, it displays recording quality and other information about the current program for entry 908a, "Red Dog Rising."

Navigation of the categories area allows selection of a new category and a corresponding update of the listed programs. This allows other types of programming to be previewed along with that selected or downloaded from the content provider. For example, FIG. 9A illustrates the alternatives "Movies" 906c, "Sitcoms" 906d, and "Sports" 906e, which each categorize a corresponding set of broadcast programming, and the alternative "Downloads" 906b categorizes content that is available or downloaded from other DVR users. The user navigates among the categories 906a-e to update the content area to show the corresponding programming. Additional categories beyond those shown may be provided, so the categories area 906a-e is scrollable to allow their display. Thus, new categories will appear when the cursor is navigated to the left of "CP_Name" 906a, or to the right of "Sports" 906e.

As introduced above, the content guide is automatically populated with entries corresponding to entries selected from the content provider web site. Here the user has selected the pieces of content corresponding to entries 908a-f in the content area. As a basis for automatically populating the content guide, the content provider implements a meta data format that is recognized by the DVR, preferably the same meta data format used to display the other content available in the content guide. Additionally, the DVR has preferably been updated by the VRS to recognize the content provider, and to provide a unique guide entry corresponding to the content provider. As indicated above, a preferred meta data format includes the fields: title="[title]", filedurationinseconds=" [value in seconds]", episodetitle="[name of episode]", description="[textual description of episode]", actors="[list of actors]", director="[director's name]", yearmade="[date] ", quality="[quality tag (e.g. standard)]." The meta data format is recognized by and thus allows the unit to populate the entry in the content area, the HUD and other areas of the guide. Additionally, the CP_ID, provided in the notification regarding a download, is used to automatically categorize the content under the category corresponding to the content provider, with the CP_ID being mapped to the label appearing for the content provider in the content guide.

Selected content is scheduled for transfer to the DVR. FIG. 9B illustrates the content guide 900b updated to reflect the status of the transfer. Particularly, the short description for a program will be highlighted to visually reflect the status. For example, the entries 908a-c have been completely downloaded, and thus the entire display bar corresponding to their descriptions is highlighted. Additionally, the programs described as "Bowling Highlights" and "Dogs in Space" are respectively shown to have been partially downloaded, as indicated by the highlighted portions 912a, 914a and corresponding non-highlighted portion 912b, 914b. Preferably, the proportion of highlighting corresponds to the fractional amount of the piece of content that has been downloaded, and highlighting is in the form of a color that distinguishes "available" portions of content that have already been received from portions that have not yet been received.

The user can also navigate to entries in the content guide 900b and perform various playback and download management operations. For example, the user may highlight a program that has at least been partially transferred to the DVR and select various conventional playback operational commands. Additionally, the user can confirm a download that has been tentatively scheduled, interrupt a download in progress, resume an interrupted download, or cancel a download of the content as desired. These playback and download management operations are preferably facilitated by conventional pop up menus that overlay the content guide and display buttons corresponding to the operations. Thus, the user can easily manage the content that they have selected from the approved content provider.

Thus, embodiments for providing content have been described in accordance with the present invention. Although the present invention has been described in considerable detail with reference to certain embodiments thereof, the invention may be variously embodied without departing from the spirit or scope of the invention. Therefore, the following claims should not be limited to the description of the embodiments contained herein in any way.

The invention claimed is:

1. A method for using a computer network to transmit selected content from a content provider device, the method comprising:
   receiving, by the content provider device, a unique identifier of a digital video recording device (DVR);
   registering, by the content provider device, the DVR wherein registering the DVR includes providing, by the content provider device, a login name and password to a user of the DVR;
   storing, by the content provider device, the unique identifier of the DVR;
   transmitting, by the content provider device to a server device over the computer network, the unique identifier of the DVR, wherein the server device maintains contact information associated with the DVR, wherein the contact information includes a first network address and first port of the DVR;
   receiving, by the content provider device from a browser-enabled computing device separate from the DVR after registering the DVR, the login name and password associated with the user of the DVR and a request for the selected content, wherein the content provider device connects to the server device by the computer network;
   transmitting, by the content provider device to the server device over the computer network after the content provider device receives the login name and password associated with the user of the DVR and the request for the selected content from the browser-enabled computing device, the unique identifier of the DVR;
   receiving, by the content provider device from the server device in response to the content provider device transmitting the unique identifier of the DVR to the server device, the contact information identifying the first network address and first port of the DVR; and
   transmitting, by the content provider device over the computer network, the selected content to the first network address and first port of the DVR.

2. The method of claim 1, further comprising:
   transmitting, by the content provider device to the DVR prior to the content provider device transmitting the selected content to the first network address and first port of the DVR, a request to download the selected content to the DVR; and
   receiving, by the content provider device, confirmation from the DVR to download the selected content.

3. The method of claim 2, wherein the request to download the selected content contains information used to automatically populate a content guide at the DVR with an entry that identifies the selected content.

4. The method of claim 3,
   wherein the entry that identifies the selected content is designated to a category having a category name that corresponds to the content provider device,
   wherein the content guide includes a category area and a content area, and
   wherein the entry appears in the content area when the category name is selected from the category area.

5. The method of claim 4, wherein the category name is one of a plurality of approved category names corresponding to approved content providers that are periodically provided to the DVR.

6. The method of claim 4, wherein the entry includes a visual indication of the extent of a completion of the download of the selected content to the DVR.

7. The method of claim 2,
   wherein the request to download the selected content to the DVR comprises data that identifies a size of the selected content and that causes the DVR to allocate storage for the selected content, and
   wherein, prior to the content provider device transmitting the selected content to the first network address and first port of the DVR, the method further comprises:
   the content provider device communicating with the DVR to schedule downloading of the selected content to the DVR.

8. The method of claim 1, wherein the selected content is a video program.

9. The method of claim 1, wherein the unique identifier comprises a serial number that matches a serial number located on a label on a housing of the DVR.

10. The method of claim 1, wherein the unique identifier comprises a unique Internet Serial Number of the DVR.

11. The method of claim 1, further comprising:
   after receiving the unique identifier of the DVR and contact information associated with the unique identifier, the contact information identifying a first network address and first port of the DVR, the server periodically receiving from the DVR a current network address and port information for communicating with the DVR.

12. A method for transmitting selected content from a content provider device through a computer network, the method comprising:
   receiving, by the content provider device, a unique identifier of a digital video recording device (DVR);
   registering, by the content provider device, the DVR, wherein registering the DVR includes providing, by the content provider device, a login name and password to a user of the DVR;
   storing, by the content provider device, the unique identifier of the DVR;
   transmitting, by the content provider device to a server device over the computer network, the unique identifier of the DVR, wherein the server device maintains contact information associated with the DVR, wherein the contact information includes a first network address and first port of the DVR;
   receiving, by the content provider device from a browser-enabled computing device separate from the DVR after registering the DVR, the login name and password associated with the user of the DVR and a request for the selected content, wherein the content provider device connects to the server device by the computer network;

transmitting, by the content provider device to the server device over the computer network after the content provider device receives the login name and password associated with the user of the DVR and the request for the selected content from the browser-enabled computing device, the unique identifier of the DVR;

receiving, by the content provider device from the server device in response to the content provider transmitting the unique identifier of the DVR to the server device, the contact information identifying the first network address and first port of the DVR;

transmitting, by the content provider device to the first network address and first port of DVR, a set of content identification information adapted for automatically populating a content guide with an entry that identifies the selected content; and transmitting, by the content provider over the computer network, the selected content to the first network address and first port of the DVR.

13. The method of claim 12, wherein the selected content is a video program.

14. The method of claim 13,
wherein the entry that identifies the selected content is designated to a category having a category name that corresponds to the content provider device,
wherein the content guide includes a category area and a content area, and
wherein the entry appears in the content area when the category name is selected from the category area.

15. The method of claim 14, wherein the category name is one of a plurality of approved category names corresponding to approved content providers that are periodically provided to the DVR.

16. A content provider device that is operable to transmit selected content through a computer network, the content provider device comprising:
a registration module that comprises instructions to obtain registration information for registration of a digital video recorder (DVR), wherein the registration information includes a unique identifier of the DVR, wherein the content provider device stores the unique identifier of the DVR, and wherein registration of the DVR includes associating a login name and password with a user of the DVR, wherein the content provider device is configured to receive, from a browser-enabled computing device separate from the DVR after registering the DVR, the login name and password associated with the user of the DVR and a request for the selected content;
a delivery information acquisition module comprising instructions to provide a server device with the unique identifier of the DVR so as to obtain, from the server device, contact information including a first network address and first port of the DVR; and
a download fulfillment module that communicates with the registration module and that is operable to (i) transmit, to the first network address and first port of the DVR, a set of content identification information adapted for automatic population of a content guide with an entry that identifies the selected content, and (ii) cause the selected content to be transmitted, via the computer network, to the first network address and first port of the DVR.

17. The content provider device of claim 16, wherein the selected content is a video program.

18. The content provider device of claim 17,
wherein the entry that identifies the selected content is designated to a category having a category name that corresponds to the content provider,
wherein the content guide includes a category area and a content area, and
wherein the entry appears in the content area when the category name is selected from the category area.

19. The content provider device of claim 18, wherein the category name is one of a plurality of approved category names corresponding to approved content providers that are periodically provided to the DVR.

20. A method for updating content guides to include data associated with a content provider device, the method comprising:
a server maintaining a unique identifier of a digital video recorder (DVR) and contact information associated with the unique identifier of the DVR, the contact information identifying a first network address and first port of the DVR, wherein the DVR can receive content via the first network address and the first port, and wherein the DVR comprises a content guide for concurrent display of a content area and a category area, wherein the category area displays a list of multiple selectable categories, and wherein selection of a category from the category area updates the content area to list content pertaining to the selected category;
the server receiving, through a computer network and from a content provider device, a request for the server to approve the content provider device as a provider of content to a plurality of content receiving devices, wherein the plurality of content receiving devices comprises the DVR;
the server approving the content provider device as a tier 1 content provider of content to the plurality of content receiving devices or as a tier 2 content provider of content to the plurality of content receiving devices; and
the server maintaining a list of approved tier 2 content providers, the list of approved tier 2 content providers including (i) a URL for connecting to the content provider device, and (ii) a content provider label associated with the content provider device, wherein the content provider label is selected from the group consisting of a name of the content provider device and a logo associated with the content provider device;
wherein, if the server approved the content provider device as a tier 1 content provider, then the server transmitting the URL for connecting to the content provider device and the content provider label associated with the content provider device to the DVR through the computer network and the DVR automatically updating the content guide of the DVR with the URL for connecting to the content provider device and the category area of the content guide of the DVR with the content provider label associated with the content provider device as a selectable category under which content of the content provider device is categorized,
wherein, if the server approved the content provider device as a tier 2 content provider, the server thereafter transmits the list of approved tier 2 content provider devices to the DVR, and
wherein if the content provider device is selected from the list of approved tier 2 content provider devices transmitted to the DVR, then the DVR updating the content guide of the DVR with the URL for connecting to the content provider device and the category area of the content guide of the DVR with the content provider label associated with the content provider device as a selectable category under which content of the content provider device is categorized.

21. The method of claim 20, wherein the content that can be provided to the DVR comprises a video program.

22. The method of claim 20, wherein the content provider label comprises the logo associated with the content provider device.

23. The method of claim 20, wherein the content provider label comprises the name of the content provider device and the logo associated with the content provider device.

24. A non-transitory computer-readable memory having stored therein instructions, that when executed by a computer processor, cause the computing device to perform functions comprising:
- a server maintaining a unique identifier of a digital video recorder (DVR) and contact information associated with the unique identifier of the DVR, the contact information identifying a first network address and first port of the DVR, wherein the DVR can receive content via the first network address and first port, and wherein the DVR comprises a content guide for concurrent display of a content area and a category area, wherein the category area displays a list of multiple selectable categories, and wherein selection of a category from the category area updates the content area to list content pertaining to the selected category;
- the server receiving, through a computer network and from a content provider device, a request for the server to approve the content provider device as a provider of content to a plurality of content receiving devices, wherein the plurality of content receiving devices comprises the DVR;
- the server approving the content provider device as a tier 1 content provider of content to the plurality of content receiving devices or as a tier 2 content provider of content to the plurality of content receiving devices; and
- the server maintaining a list of approved tier 2 content providers, the list of approved tier 2 content providers including (i) a URL for connecting to the content provider device, and (ii) a content provider label associated with the content provider device, wherein the content provider label is selected from the group consisting of a name of the content provider device and a logo associated with the content provider device;
- wherein, if the server approved the content provider device as a tier 1 content provider, then the server transmitting the URL for connecting to the content provider device and the content provider label associated with the content provider device to the DVR through the computer network and the DVR automatically updating the content guide of the DVR with the URL for connecting to the content provider device and the category area of the content guide of the DVR with the content provider label associated with the content provider device as a selectable category under which content of the content provider device is categorized,
- wherein, if the server approved the content provider device as a tier 2 content provider, the server thereafter transmits the list of approved tier 2 content provider devices to the DVR, and
- wherein if the content provider device is selected from the list of approved tier 2 content provider devices transmitted to the DVR, then the DVR updating the content guide of the DVR with the URL for connecting to the content provider device and the category area of the content guide of the DVR with the content provider label associated with the content provider device as a selectable category under which content of the content provider device is categorized.

25. The non-transitory computer-readable memory of claim 24, wherein the content that can be provided to the DVR comprises a video program.

26. The non-transitory computer-readable memory of claim 24, wherein the content provider label comprises the name of the content provider device and the logo associated with the content provider device.

27. A method for receiving selected content at a receiving device via a computer network, the method comprising:
- outputting, by a graphics module of the receiving device to a display, signals for displaying a first content guide and a second content guide, wherein the first content guide identifies content that is available for recording at the receiving device and content that will become available for recording at the receiving device, wherein the second content guide identifies content recorded by the receiving device, content selected for recording by the receiving device, a plurality of content categories, and one or more entries that identify content associated with a currently-selected content category selected from the plurality of content categories, and wherein, when a given content category is the currently-selected content category, the entry that identifies the selected content is displayable only if the entry was categorized into the given content category;
- transmitting, from the receiving device, an identifier of the receiving device and a request for the selected content, wherein the selected content is selected from the first content guide;
- in response to the receiving device transmitting the identifier of the receiving device and the request for the selected content, the receiving device receiving (i) a request to download the selected content, (ii) data indicating a size of the selected content, (iii) a set of content identification information for populating the second content guide with an entry that identifies the selected content, and (iv) content provider identification data;
- adding the content provider identification data as a new category into at least one of the first content guide at the receiving device and the second content guide at the receiving device;
- populating, by the receiving device, the entry that identifies the selected content into the second content guide;
- outputting, by the graphics module of the receiving device, signals for displaying the second content guide with the entry that identifies the selected content populated into the second content guide by the receiving device;
- the receiving device determining that sufficient storage is available for the selected content and allocating a portion of the storage for storing the selected content; and
- the receiving device transmitting a communication to schedule downloading of the selected content and thereafter the receiving device receiving the selected content via the computer network; and
- the receiving device converting the selected content into a format compatible with a display device and providing the display device with the selected content converted into the format compatible with the display device.

28. The method of claim 27, wherein the selected content is a video program.

29. The method of claim 28,
- wherein the second content guide includes a heads up display area operable to display additional information about a currently-selected entry, and wherein, when the entry that identifies the selected content is the currently-selected entry, the entry that identifies the selected content is displayed at a first area of the second content guide, and the heads up display area, positioned above the displayed plurality of content categories, displays additional information about the entry that identifies the selected content.

30. The method of claim 29,
wherein the given content category has a category name that corresponds to a content provider associated with the content provider device, and
wherein the category name is one of a plurality of approved category names corresponding to approved content providers that are periodically provided to the receiving device.

31. The method of claim 27, wherein the identifier of the receiving device comprises a unique Internet Serial Number of the receiving device.

32. The method of claim 27, further comprising:
transmitting, from the receiving device to the content provider device, a login name and password associated with a user of the receiving device, wherein transmitting the login name and password occurs prior to the receiving device receiving the request to download the selected content, the data indicating the size of the selected content, and the set of content identification information.

33. The method of claim 27, wherein the content provider information comprises a new content provider identifier and a corresponding content provider name label.

34. The method of claim 33, wherein the content provider name label is associated with a URL such that selecting the content provider name label results in the receiving device navigating to a web site of a content provider identified by the new content provider identifier.

35. The method of claim 27, further comprising:
concurrently displaying, via the second content guide, a category area and a content area, wherein the category area identifies multiple selectable categories,
receiving a selection of a selected category from among the multiple selectable categories being displayed via the second content guide, and
updating the content area of the second content guide to identify content pertaining to the selected category.

36. The method of claim 35, further comprising:
displaying the selected category in a header area of the second content guide and continuing to display the selected category within the category area that identifies the multiple selectable categories.

37. The method of claim 35, further comprising:
displaying, within the content area of the second content guide, a visual highlight for content being transferred to the receiving device,
wherein the visual highlight corresponds to a fractional amount of content that has been downloaded.

38. The method of claim 27, further comprising:
concurrently displaying, via the second content guide, a category area, a content area, and a head-up display area,
wherein the category area identifies multiple selectable categories,
wherein the head-up display area displays additional information about content selected within content area.

39. The method of claim 38, wherein the additional information comprises recording quality information.

40. An apparatus that is operable to receive selected content via a computer network, the apparatus comprising:
a first content guide that identifies content that is available for recording at the apparatus and content that will become available for recording at the apparatus;
a second content guide that identifies content recorded at the apparatus, content selected for recording at the apparatus, a plurality of content categories, and one or more entries that identify content associated with a currently-selected content category selected from the plurality of content categories, wherein, when a given content category is the currently-selected content category, the entry that identifies the selected content is displayable only if the entry was categorized into the given content category;
a graphics module to output to a display device signals for display the first content guide and the second content guide;
a content identification module that transmits an identifier of the apparatus and a request for the selected content to the content provider device, wherein the selected content is selected from the first content guide;
a guide module that receives from the content provider device, in response to the content identification module transmitting the identifier of the apparatus and the request for the selected content, (i) a request to download the selected content, (ii) data indicating a size of the selected content, (iii) a set of content identification information for populating the second content guide with an entry that identifies the selected content, and (iv) content provider identification data, wherein the guide module adds the content provider identification data as a new category into at least one of the first content guide at the apparatus and the second content guide at the apparatus;
a content transfer module that determines that sufficient storage is available for the selected content, allocates a portion of the storage for storage of the selected content, and communicates with the content provider device to schedule downloading of the selected content, and thereafter receive the selected content from the content provider device through the computer network, and
an AV output module to convert the selected content into a format compatible with a display device and to provide the display device with the selected content converted into the format compatible with the display device,
wherein the apparatus populates the entry that identifies the selected content into the second content guide, and
wherein the graphics module outputs signals for displaying the second content guide with the entry that identifies the selected content populated into the second content guide by the receiving device.

41. The apparatus of claim 40, wherein the selected content is a video program.

42. The apparatus of claim 41,
wherein the second content guide includes a heads up display area operable to display additional information about a currently-selected entry, and
wherein, when the entry that identifies the selected content is the currently-selected entry, the entry that identifies the selected content is displayed at a first area of the second content guide, and the heads up display area, positioned above the displayed plurality of content categories, displays additional information about the entry that identifies the selected content.

43. The apparatus of claim 42,
wherein the given content category has a category name that corresponds to a content provider associated with the content provider device, and wherein the category name is one of a plurality of approved category names corresponding to approved content providers that are periodically provided to the receiving device.

44. A non-transitory computer-readable memory having stored therein instructions, that when executed by a computer processor, cause the computing device to perform functions comprising:

outputting, by a graphics module of the receiving device to a display, signals for displaying a first content guide and a second content guide, wherein the first content guide identifies content that is available for recording at the receiving device and content that will become available for recording at the receiving device, wherein the second content guide identifies content recorded by the receiving device, content selected for recording by the receiving device, a plurality of content categories, and one or more entries that identify content associated with a currently-selected content category selected from the plurality of content categories, and wherein, when a given content category is the currently-selected content category, the entry that identifies the selected content is displayable only if the entry was categorized into the given content category;

transmitting from the receiving device, an identifier of the receiving device and a request for the selected content, wherein the selected content is selected from the first content guide;

in response to the receiving device transmitting the identifier of the receiving device and the request for the selected content, the receiving device receiving (i) a request to download the selected content, (ii) data indicating a size of the selected content, (iii) a set of content identification information for populating the second content guide with an entry that identifies the selected content, and (iv) content provider identification data;

adding the content provider identification data as a new category into at least one of the first content guide at the receiving device and the second content guide at the receiving device;

populating, by the receiving device, the entry that identifies the selected content into the second content guide;

outputting, by the graphics module of the receiving device, signals for displaying the second content guide with the entry that identifies the selected content populated into the second content guide by the receiving device;

the receiving device determining that sufficient storage is available for the selected content and allocating a portion of the storage for storing the selected content; and the receiving device transmitting a communication to schedule downloading of the selected content and thereafter the receiving device receiving the selected content via a computer network; and the receiving device converting the selected content into a format compatible with a display device and providing the display device with the selected content converted into the format compatible with the display device.

45. The non-transitory computer-readable memory of claim 44, wherein the selected content is a video program.

46. The non-transitory computer-readable memory of claim 45, wherein the second content guide includes a heads up display area operable to display additional information about a currently-selected entry, and wherein, when the entry that identifies the selected content is the currently-selected entry, the entry that identifies the selected content is displayed at a first area of the second content guide, and the heads up display area, positioned above the displayed plurality of content categories, displays additional information about the entry that identifies the selected content.

47. The non-transitory computer-readable memory of claim 46, wherein the given content category has a category name that corresponds to a content provider associated with the content provider device, and wherein the category name is one of a plurality of approved category names corresponding to approved content providers that are periodically provided to the receiving device.

* * * * *